(12) United States Patent
Yoshida

(10) Patent No.: US 6,476,955 B1
(45) Date of Patent: Nov. 5, 2002

(54) MULTI-BEAM SCANNING OPTICAL SYSTEM AND IMAGE FORMING APPARATUS USING IT

(75) Inventor: Hiroki Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/658,664

(22) Filed: Sep. 8, 2000

(30) Foreign Application Priority Data

Sep. 13, 1999 (JP) .......................... 11-258784
Sep. 13, 1999 (JP) .......................... 11-258785

(51) Int. Cl.[7] ............................ G02B 26/08
(52) U.S. Cl. ............... 359/204; 359/216; 359/217; 347/235; 347/243; 250/235
(58) Field of Search ............... 359/204–219; 250/234–236; 347/233–235, 241–244

(56) References Cited

U.S. PATENT DOCUMENTS

| | | | | |
|---|---|---|---|---|
| 4,733,064 | A | 3/1988 | Ishikawa | 250/201 |
| 4,933,549 | A | 6/1990 | Fujioka et al. | 250/235 |
| 5,084,616 | A | 1/1992 | Morimoto | 250/235 |
| 5,357,106 | A | 10/1994 | Wilson | 250/236 |
| 5,774,248 | A | 6/1998 | Komatsu | 359/204 |
| 5,786,594 | A | 7/1998 | Ito et al. | 250/236 |
| 6,317,244 | B1 * | 11/2001 | Ishibe | 359/204 |

FOREIGN PATENT DOCUMENTS

| | | |
|---|---|---|
| JP | 61-53616 | 3/1986 |
| JP | 62-240920 | 10/1987 |
| JP | 8-190071 | 7/1996 |
| JP | 8-227047 | 9/1996 |
| JP | 9-54263 | 2/1997 |

* cited by examiner

Primary Examiner—James Phan
(74) Attorney, Agent, or Firm—Fitzpatrick, Cella, Harper & Scinto

(57) ABSTRACT

Provided are a multi-beam scanning optical system capable of implementing high-quality printing in relatively simple structure and at high speed, and an image forming apparatus using it. The multi-beam scanning optical system has an incidence optical unit for guiding a plurality of beams emitted from a light source unit having a plurality of light-emitting regions spaced apart from each other in a main scanning direction, to a deflector; a scanning optical unit for focusing the plurality of beams deflected by the deflector, on a surface to be scanned; and a synchronism-detecting optical unit for converging part of the plurality of beams deflected by the deflector, via a return mirror on a slit surface by a lens section, thereafter guiding the beams to a synchronism detector, and controlling timing of a scan start position on the surface to be scanned, by use of a signal from the synchronism detector. The elements are set so as to satisfy Condition (A) where $\delta M$ is a defocus amount in a main scanning section of the beams guided to the synchronism detector and in a view from the slit surface and $\delta X$ is a defocus amount at each image height on the surface to be scanned.

8 Claims, 21 Drawing Sheets

SLIT

ORIGINAL PRINTING
START POSITION

SLIT

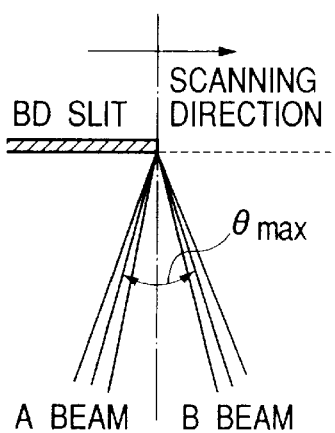
FIG. 16A
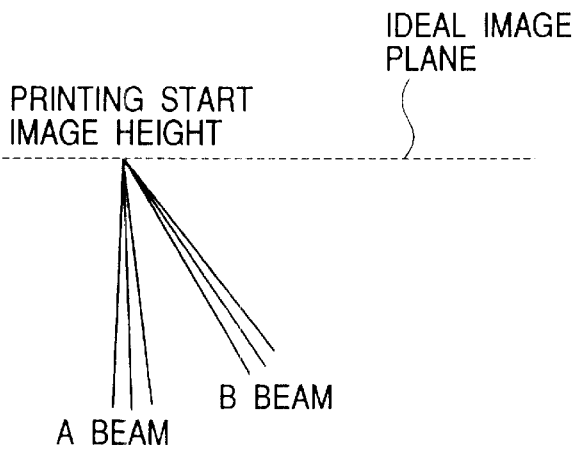
FIG. 16B
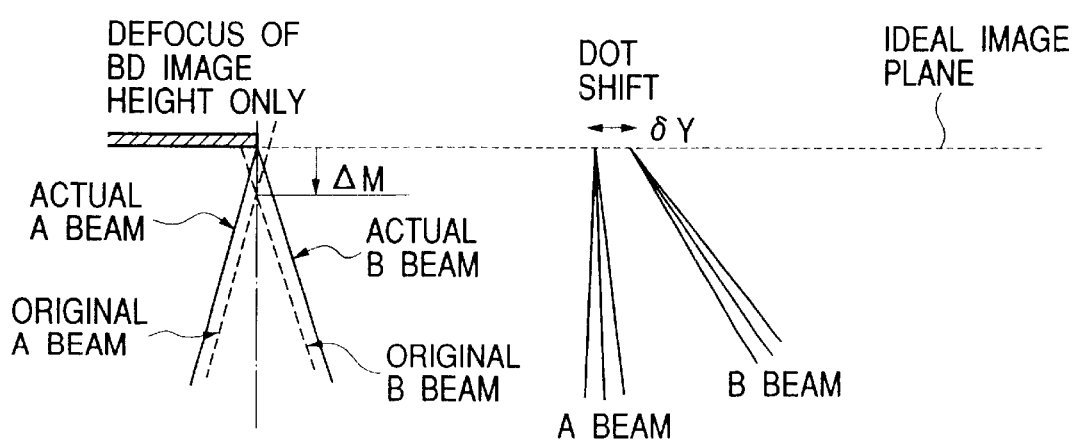
FIG. 17A
FIG. 17B

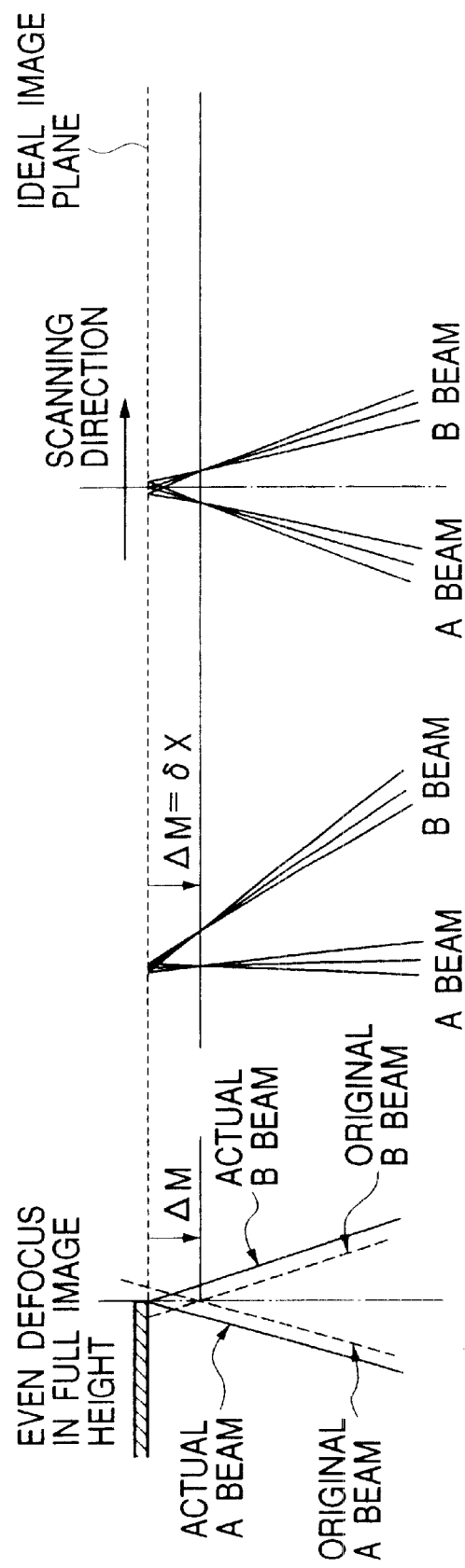

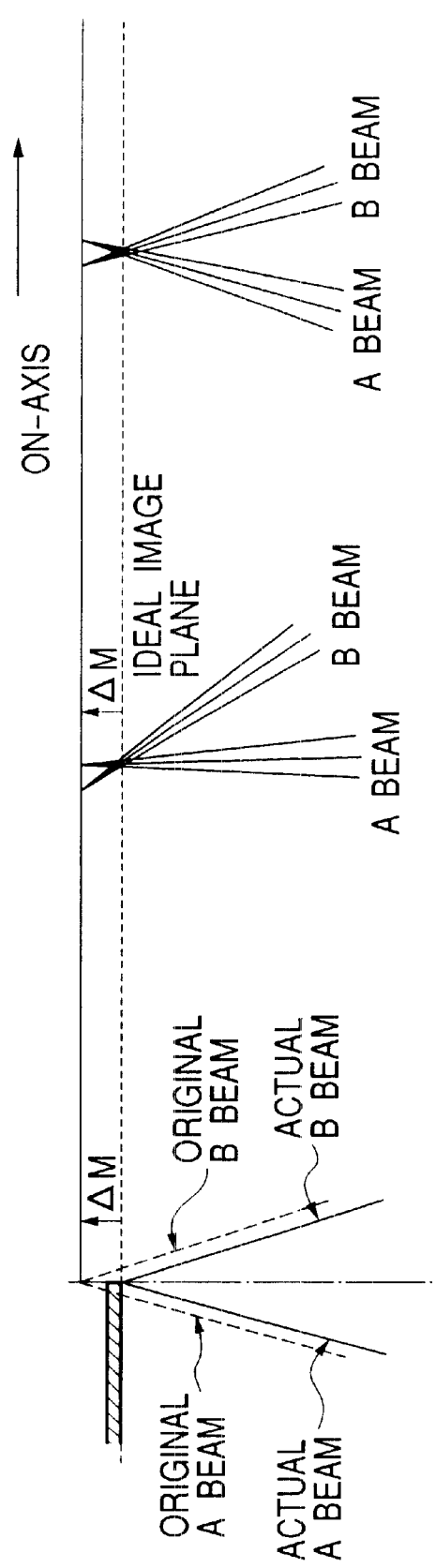

MULTI-BEAM SCANNING OPTICAL SYSTEM AND IMAGE FORMING APPARATUS USING IT

BACKGROUND OF THE INVENTION

1. Field of the Invention

The present invention relates to a multi-beam scanning optical system and an image forming apparatus using it and, more particularly, the invention is suitably applicable to image forming apparatus, for example, such as laser beam printers, digital copiers, and so on, capable of implementing high-quality printing in relatively simple structure and at high speed.

2. Related Background Art

Scanning optical systems used heretofore in the image forming apparatus such as the laser beam printers, the digital copiers, and so on are constructed in such structure that light emitted from a light source is guided to a deflecting means by an incidence optical means, that the light deflected by the deflecting means is focused in a spot shape on a surface of a photosensitive drum, which is a surface to be scanned, by a scanning optical means, and that the surface of the photosensitive drum is optically scanned by the light.

With a recent trend toward higher performance and advanced functions of the image forming apparatus, there is the growing need for higher speed and use of plural light sources is under study in order to meet the need. For example, Japanese Patent Application Laid-Open No. 09-54263 suggests the multi-beam scanning optical system using a multi-beam laser chip as a light source, which is a light source of a single chip for emitting a plurality of laser beams aligned on a straight line.

In the case of such multi-beam scanning optical systems, it is common practice to provide an optical means for detection of synchronism (BD optical system) immediately before writing of image signals in order to accurately control start positions of images.

FIG. 22 is a principal, cross-sectional view in the main scanning direction of a conventional multi-beam scanning optical system (which is a main scanning section view). In the same figure, numeral 51 designates a light source unit, for example, having two light-emitting regions (light sources) of semiconductor laser. The two light-emitting regions are spaced from each other in the main scanning direction and in the sub-scanning direction. Numeral 52 denotes an aperture stop, which shapes each of beams emitted from the respective light-emitting regions, into a desired optimal beam shape. Numeral 53 indicates a collimator lens, which converts the beams having passed through the aperture stop 52, into nearly parallel beams. Numeral 54 represents a cylindrical lens, which has a predetermined refractive power only in the sub-scanning direction. Each of such elements as the aperture stop 52, the collimator lens 53, and the cylindrical lens 54 composes an element of the incidence optical means 62.

Numeral 55 designates a deflecting means, which is comprised, for example, of a rotary polygon mirror and which is rotated at a constant speed in a direction of an arrow A in the drawing by a driving means such as a motor or the like (not illustrated). Numeral 56 denotes a scanning optical means having the f-θ characteristic, which has two f-θ lenses as first and second f-θ lenses. The scanning optical means 56 establishes a conjugate relation between the vicinity of a deflecting facet 55a of the optical deflector 55 and the vicinity of the photosensitive drum surface 57 as a surface to be scanned, in the sub-scanning section, thus having an inclination correction function.

Numeral 58 indicates a return mirror (which will be referred to hereinafter as a "BD mirror"), which reflects a plurality of beams (BD beams) for detection of synchronous signals for adjusting the timing of scan start positions on the photosensitive drum surface 57, toward a synchronism detector 61 described hereinafter. Numeral 59 represents a slit plate (hereinafter referred to as a "BD slit plate"), which is located at a position equivalent to the photosensitive drum surface 57. Numeral 60 denotes an imaging lens (hereinafter referred to as a "BD lens"), which is mounted for establishing a conjugate relation between the BD mirror 58 and the synchronism detector 61 and which corrects surface inclination of the BD mirror 58. Numeral 61 designates a photosensor as a synchronism detector (which will be referred to hereinafter as a "BD sensor"). Each of such elements as the return mirror 58, the BD slit plate 59, the BD lens 60, and the BD sensor 61 constitutes an element of a synchronism-detecting optical means (or BD optical system).

In the same figure, BD detection is carried out for each of the BD beams and the timing of the scan start position for image recording onto the photosensitive drum surface 57 is adjusted for each of the BD beams by use of output from the BD sensor 61.

Incidentally, in the case of the multi-beam scanning optical systems with a plurality of light-emitting regions (light sources), if the spacing in the main scanning direction between the light sources varies with progress in scanning for various reasons, it will result in deteriorating a printed image. The printed image will also deteriorate if there is deviation between writing start positions of the respective light-emitting regions, even without the variation in the spacing in the main scanning direction between the light-emitting regions during scanning.

A cause to induce the above phenomenon is conceivably existence of difference between defocus amount of the BD beams on the BD slit surface and defocus amount of the scanning beams on the surface to be scanned.

This will be explained below with reference to FIGS. 16A and 16B to FIGS. 21A, 21B, and 21C. It is noted that marginal rays are omitted in FIG. 17A, FIG. 18A, FIG. 20A, and FIG. 21A in order to avoid complication of illustrations.

FIG. 16A shows a state in which each of beams (A-and B-beams in this case) is focused just at one edge on the BD slit plate in the main scanning direction. The A-beam scans the slit plate from left to right in the drawing and first enters the BD sensor just at the left edge of a slit in the BD slit plate, whereupon the BD sensor outputs a signal to indicate the entrance of the A-beam. The B-beam also scans the slit plate from left to right and, just as the A-beam, it first enters the BD sensor just at the left edge of a slit in the BD slit plate, whereupon the BD sensor outputs a signal to indicate the entrance of the B-beam. The timing of the writing start positions of the A- and B-beams is adjusted by detecting the timing of these two signals.

However, if the focus position in the main scanning section of the A- and B-beams having passed through the BD optical system is shifted by δM to this side, i.e., toward the deflecting means as illustrated in FIG. 17A, there will occur the phenomenon as described below, so as to cause the difference between start positions of the A- and B-beams. The A-beam without defocus (actual A-beam) is converged at the left edge of the slit in the BD slit plate and is about to enter the BD sensor at this point. In contrast, the A-beam with defocus (original A-beam) has already entered the surface of the BD sensor (the right dashed line in the figure). The A-beam actually starts entering the BD sensor when arriving at the position of the left solid line in the figure. Therefore, the start timing of the A-beam is earlier by the degree of deviation between the dashed line and the solid line. On the other hand, the B-beam (original B-beam) fails to enter the sensor because of the defocus though it should start entering the BD sensor at the left dashed line. Actually, the B-beam can first enter the BD sensor at the position of the right solid line (actual B-beam) and thus the start timing of the B-beam becomes later by the deviation between the left dashed line and the right solid line. As a result, the start positions of the A- and B-beams will have a difference equal to the distance between the two dashed lines on the BD slit surface.

The difference $\delta Y$ between the start positions of the A- and B-beams is determined by the defocus amount $\delta M$ and the angle of incidence $\theta$ [rad] (the angle of incidence being 0 [rad] when the beam is incident in parallel to the optical axis of the BD optical system) and can approximately be described as follows.

$$\delta Y = \delta M \times \theta \tag{1}$$

Similarly, a maximum difference $\delta Y total$ between the start positions of the respective light-emitting regions is determined as follows where $\theta max$ [rad] indicates a maximum angle difference between angles of incidence.

$$\delta Y total = \delta M \times \theta max \tag{2}$$

Therefore, where $\delta Ymax$ represents a permissible maximum difference between start positions of respective scan lines and $\delta Mmax$ a permissible maximum defocus determined from $\delta Ymax$, the multi-beam scanning optical system needs to be constructed so that the defocus amount $\delta M$ satisfies the following relation.

$$|\delta M| \leq \delta Mmax = \delta Ymax/\theta max \tag{3}$$

It is preferable that $\delta Ymax$ be not more than about half of the resolution in the sub-scanning direction. Over this range, adjacent lateral lines will start looking as shifted from each other and the result of printing will become very hard to look.

In this connection, supposing $\delta Ymax = 10$ $\mu$m (which is equal to a half dot in the density of 1200 dpi) and $\theta max = 0.5$ [rad], the maximum defocus should be as follows.

$$\delta Mmax = 1.15 \text{ mm}$$

However, above Equations (1) to (3) hold when only the BD optical system is out of focus. If defocus also occurs on the surface to be scanned, in the same amount and in the same direction (toward the deflecting means in FIGS. 17A and 17B) as that of the BD optical system, the difference between start positions of the A- and B-beams, which is called a dot shift, will rarely occur. Let us suppose that the focus position in the main scanning section of the A- and B-beams having passed through the BD optical system is shifted by $\delta M$ to this side, i.e., toward the deflecting means as illustrated in FIG. 18A. At this time the dot shift will appear between the A- and B-beams as described previously. However, if there is uniform defocus of $\delta M$ on the surface to be scanned, the dot shift will appear at the position $\delta M$ apart as illustrated in FIG. 18B.

However, the ideal image plane (the surface to be scanned) is placed $\delta M$ apart on that side and the distance between the two A- and B-beams becomes almost zero when the A- and B-beams are incident to the ideal image plane (the surface to be scanned). FIG. 18C is an illustration of the positional relation between rays near the axis and it is also seen that the dot shift is canceled out, from the fact that there is a relation close to congruence between a triangle having oblique lines along the principal rays of the A- and B-beams and a base along a straight line at the position $\delta M$ apart from the surface to be scanned, and a triangle having oblique lines along the original A- and B-beams indicated by the dashed lines in FIG. 18A and a base along the BD slit surface. In this case, however, the position on the surface to be scanned deviates from the best spot position, but the image quality is rarely affected thereby as long as the focus position is within the permissible depth range.

The above described the case in which the focus position is shifted to this side of the BD slit plate, but the same can also apply to the case in which the focus position is shifted to that side of the BD slit plate, as seen from FIGS. 19A and 19B to FIGS. 21A, 21B, and 21C.

From reverse observation of the above description, it is seen that, where there is uniform defocus on the surface to be scanned, the image will deteriorate unless the focus position in the BD optical system also deviates similarly. When the defocus amount on the surface to be scanned and the defocus amount in the BD optical system are normalized separately from each other, it can be expected that a great dot shift will appear if the defocuses are opposite to each other. Further, it is also readily predictable that if there is great curvature of field on the surface to be scanned the spacing between the beams will also vary according to the curvature. It is thus seen that the multi-beam scanning optical system needs to be constructed so that the defocus amount $\delta X$ at each image height on the surface to be scanned satisfies the following relation from Eq. (3).

$$|\delta X - \delta M| \leq \delta Mmax = \delta Ymax/\theta max \tag{4}$$

Of course, if angles of incidence of the respective beams to the surface to be scanned are exactly equal, the start positions of scan lines will deviate uniformly equal and there will occur no deviation between the start positions of the respective light-emitting regions, because the start positions simply deviate all together.

However, the condition as described above cannot be realized except in the case where the light-emitting regions are placed in a state without deviation in the main scanning direction, i.e., are aligned in a line in the sub-scanning direction, or except in the case where the principal rays of the respective beams are crossed on the polygon mirror surface by use of a relay optical system. In the former case, where the light-emitting regions are arranged in this way and, particularly, where the system is constructed as an enlarging system in the sub-scanning direction, the distance between the light-emitting regions is normally too short, approximately from several $\mu$m to several ten $\mu$m (whereas the distance is normally about 100 $\mu$m between the light-emitting regions of multiple lasers commercially available), and this will cause crosstalk and make a difference between light amounts of the respective light-emitting regions to impede stable oscillation, and will further tend to shorten the lifetime. In the latter case, use of the relay optical system increases the number of necessary optical elements and thus is not preferable in terms of the space and cost.

In the case of the multi-beam scanning optical systems without the BD slit in the BD optical system, the edge portions of the BD sensor result in functioning as the BD slit and thus the above description can be understood by replacing the left edge of the slit in the BD slit plate with the left edge of the effective part of the BD sensor and the BD slit surface with a photoreceptive surface of the BD sensor.

The scanning direction was from left to right in the drawing in the above description, but the same can also apply to the case of the opposite scanning direction except that the left edge of the slit in the BD slit plate to determine the timing of writing start is replaced by the right edge of the slit in the BD slit plate on the right side, which is not illustrated in the figures.

An object of the present invention is to provide a multi-beam scanning optical system capable of implementing high-quality printing in relatively simple structure and at high speed, and an image forming apparatus using it.

In the multi-beam scanning optical system designed to perform the BD detection for each of the BD beams as illustrated in FIG. 22, where the focus position of the BD beams deviates from the BD slit surface because of manufacturing errors of lenses, assembly errors, focus errors of lenses, and so on, except in the case where the beams are incident in parallel to the optical axis of the BD optical system (the beams will be represented by the principal rays of the respective beams in the following description, because the beams with width complicate understanding of the timing of BD), the timing when the principal rays of the respective BD beams pass the edge of the BD slit, will differ from that without the defocus, posing the problem that the start positions of images deviate from each other.

FIGS. 29A, 29B, and 29C are principal, schematic diagrams to show the positional relation between the principal rays of partial beams (BD beams) of the respective beams emitted from the two light-emitting regions (light sources). FIG. 29A shows the positional relation between the principal rays from the respective light-emitting regions in the ideal state of the BD beams without defocus, FIG. 29B the positional relation between the principal rays from the respective light-emitting regions in the case of occurrence of defocus of the BD beams, and FIG. 29C the positional relation between the principal rays from the respective light-emitting regions with improvement in the converging state on the BD slit surface by some method.

The writing start positions on the surface to be scanned are originally timed by the beams going past by one edge of the BD slit as illustrated in FIG. 29A, whereas, with occurrence of defocus of the BD beams as illustrated in FIG. 29B, the original beam (indicated by the solid line in the same figure) is intercepted by the BD slit plate in the case of the A-beam and the actual start position of the A-beam is determined by the ray indicated by the dashed line. In other words, the start position of the A-beam is shifted by the degree of transition from the state of the solid line to the state of the dashed line of the A-beam. The same can also apply to the B-beam, so that writing thereof starts earlier by the deviation between the solid line and the dashed line. Therefore, the start positions of the A- and B-beams will deviate from each other by the distance between the solid lines on the BD slit surface.

The deviation amount $\delta Y$ between the start positions of the A- and B-beams is determined from the defocus amount $\delta M$ and the angle of incidence $\theta$ (the angle of incidence being 0° in the parallel state to the optical axis of the BD optical system), and can approximately be described as follows.

$$\delta Y = \delta M \cdot \tan(\theta) \quad (5)$$

Similarly, the total deviation $\delta Y$total is determined as follows where the maximum angle difference between angles of incidence is $\theta$max.

$$\delta Y \text{total} = \delta M \cdot \tan(\theta \text{max}) \quad (6)$$

Letting $\delta Y$max be the permissible maximum deviation between start positions of scan lines and $\delta M$max be the permissible maximum defocus determined from $\delta Y$max, the multi-beam scanning optical system needs to be constructed so that the defocus amount $\delta M$ satisfies the following relation.

$$|\delta M| \leq \delta M \text{max} = \delta Y \text{max}/\tan(\theta \text{max}) \quad (7)$$

For example, supposing $\delta Y$max=11 $\mu$m and $\theta$max=0.5°, $\delta M$max=1.26 mm.

Of course, if the angles of incidence of the respective beams onto the surface to be scanned are exactly equal, the start positions of the scan lines will deviate uniformly equal and there will appear no deviation between the write start positions of the respective light-emitting regions, because the start positions simply deviate all together.

SUMMARY OF THE INVENTION

A multi-beam scanning optical system according to one aspect of the present invention is a multi-beam scanning optical system comprising incidence optical means for guiding a plurality of beams emitted from light source means having a plurality of light-emitting regions spaced apart from each other in a main scanning direction, to deflecting means; scanning optical means for focusing the plurality of beams deflected by the deflecting means, on a surface to be scanned, to form a plurality of scan lines; and synchronism-detecting optical means for converging part of the plurality of beams deflected by the deflecting means, on a slit surface by a lens section, thereafter guiding the beams to a synchronism detector, and controlling timing of a scan start position on the surface to be scanned for each of the plurality of beams by use of a signal from the synchronism detector, wherein the following condition is satisfied:

$$|\delta M1| \leq \delta Y \text{max}/\tan(\theta \text{max})$$

(where
$\delta M1$: defocus amount in a main scanning section of the beams guided to the synchronism detector and in a view from the slit;
$\delta Y$max: permissible dot shift amount per scan line;
$\theta$max: maximum angle difference between angles of incidence to the slit surface of the beams used for detection of synchronism).

In the multi-beam scanning optical system according to another aspect of the invention, the permissible dot shift amount per scan line is not more than half of resolution in a sub-scanning direction.

The multi-beam scanning optical system according to another aspect of the invention comprises correction means for relatively shifting a focus position in the main scanning section of the beams guided to said synchronism detector in a direction of the optical axis of said synchronism-detecting optical means from said slit surface.

The multi-beam scanning optical system according to another aspect of the invention comprises correction means for moving the position of said slit surface or a unit including the slit surface in a direction of the optical axis of said synchronism-detecting optical means.

In the multi-beam scanning optical system according to another aspect of the invention, said lens section is disposed in an optical path between said deflecting means and said slit surface, and the optical system comprises correction means for moving said lens section in a direction of the optical axis of said synchronism-detecting optical means.

In the multi-beam scanning optical system according to another aspect of the invention, at least one lens forming said lens section is integrated with said scanning optical means, and the optical system comprises correction means for moving at least one lens of the lens section not integrated with the scanning optical means, and said slit surface in a direction of the optical axis of said synchronism-detecting optical means.

In the multi-beam scanning optical system according to another aspect of the invention, said lens section is integrated with said scanning optical means, and the optical system comprises correction means for moving at least one optical element of the scanning optical means in a direction of the optical axis of the scanning optical means and for moving said slit surface in a direction of the optical axis of said synchronism-detecting optical means.

In the multi-beam scanning optical system according to another aspect of the invention, at least one lens forming said lens section is integrated with said scanning optical means, and the optical system comprises correction means for moving at least one lens forming the scanning optical means in the main scanning direction.

A multi-beam scanning optical system according to a further aspect of the invention is a multi-beam scanning optical system comprising incidence optical means for guiding a plurality of beams emitted from light source means having a plurality of light-emitting regions spaced apart from each other in a main scanning direction, to deflecting means; scanning optical means for focusing the plurality of beams deflected by the deflecting means, on a surface to be scanned, to form a plurality of scan lines; and synchronism-detecting optical means for converging part of the plurality of beams deflected by the deflecting means, on a slit surface by a lens section, thereafter guiding the beams to a synchronism detector, and controlling timing of a scan start position on the surface to be scanned for each of the plurality of beams by use of a signal from the synchronism detector, said multi-beam scanning optical system comprising correction means for correcting a dot shift per scan line on the surface to be scanned, which occurs because of a defocus amount δM1 in a main scanning section of the beams guided to the synchronism detector and in a view from the slit surface.

In the multi-beam scanning optical system according to another aspect of the invention, said dot shift is not more than half of resolution in a sub-scanning direction.

In the multi-beam scanning optical system according to another aspect of the invention, said plurality of light-emitting regions are spaced apart from each other in the main scanning direction and in the sub-scanning direction.

In the multi-beam scanning optical system according to another aspect of the invention, a slit in said slit surface is inclined in the sub-scanning direction according to the dot shift per scan line on said surface to be scanned.

The multi-beam scanning optical system according to another aspect of the invention comprises rotating means for rotating said slit surface or a unit including the slit surface about the optical axis of the synchronism-detecting optical means according to the dot shift per scan line on said surface to be scanned.

A multi-beam scanning optical system according to a further aspect of the invention is a multi-beam scanning optical system comprising incidence optical means for guiding a plurality of beams emitted from light source means having a plurality of light-emitting regions spaced apart from each other in a main scanning direction, to deflecting means; scanning optical means for focusing the plurality of beams deflected by the deflecting means on a surface to be scanned, to form a plurality of scan lines; and synchronism-detecting optical means for guiding part of the plurality of beams deflected by the deflecting means, to a synchronism detector by a lens section and controlling timing of a scan start position on the surface to be scanned for each of the plurality of beams by use of a signal from the synchronism detector, wherein the following condition is satisfied:

$$|\delta M2| \leq \delta Y\max/\tan(\theta\max)$$

(where
δM2: defocus amount in a main scanning section of the beams guided to the synchronism detector and in a view from a photoreceptive surface of the synchronism detector;

δYmax: permissible dot shift amount per scan line;

θmax: maximum angle difference between angles of incidence to the photoreceptive surface of the beams used for detection of synchronism).

In the multi-beam scanning optical system according to another aspect of the invention, the permissible dot shift amount per scan line is not more than half of resolution in a sub-scanning direction.

The multi-beam scanning optical system according to another aspect of the invention comprises correction means for relatively shifting a focus position in the main scanning section of the beams guided to said synchronism detector in a direction of the optical axis of said synchronism-detecting optical means from the photoreceptive surface of the synchronism detector.

The multi-beam scanning optical system according to another aspect of the invention comprises correction means for moving the position of said synchronism detector or a unit including the synchronism detector in a direction of the optical axis of said synchronism-detecting optical means.

In the multi-beam scanning optical system according to another aspect of the invention, said lens section is disposed in an optical path between said deflecting means and said synchronism detector, and the optical system comprises correction means for moving said lens section in a direction of the optical axis of said synchronism-detecting optical means.

In the multi-beam scanning optical system according to another aspect of the invention, at least one lens forming said lens section is integrated with said scanning optical means, and the optical system comprises correction means for moving at least one lens of the lens section not integrated with the scanning optical means, and said synchronism detector in a direction of the optical axis of said synchronism-detecting optical means.

In the multi-beam scanning optical system according to another aspect of the invention, said lens section is integrated with said scanning optical means, and the optical system comprises correction means for moving at least one optical element of the scanning optical means in a direction of the optical axis of the scanning optical means and for moving said synchronism detector in a direction of the optical axis of said synchronism-detecting optical means.

In the multi-beam scanning optical system according to another aspect of the invention, at least one lens forming said lens section is integrated with said scanning optical means, and the optical system comprises correction means for moving at least one lens forming the scanning optical means in the main scanning direction.

A multi-beam scanning optical system according to a further aspect of the invention is a multi-beam scanning optical system comprising incidence optical means for guiding a plurality of beams emitted from light source means having a plurality of light-emitting regions spaced apart from each other in a main scanning direction, to deflecting means; scanning optical means for focusing the plurality of beams deflected by the deflecting means, on a surface to be scanned; and synchronism-detecting optical means for converging part of the plurality of beams deflected by the light-deflecting means, on a slit surface by a lens section, thereafter guiding the beams to a synchronism detector, and controlling timing of a scan start position on the surface to be scanned by use of a signal from the synchronism detector, wherein, where $\delta M1$ is a defocus amount in a main scanning section of the beams guided to the synchronism detector and in a view from the slit surface and $\delta X$ is a defocus amount at each image height on the surface to be scanned, the following condition is satisfied:

$$|\delta X - \delta M1| \leq \delta Y\text{max}/\theta\text{max}$$

(where $\delta Y$max: permissible dot shift amount per scan line;

$\theta$max: maximum angle difference between angles of incidence to the slit surface of the beams used for detection of synchronism).

In the multi-beam scanning optical system according to another aspect of the invention, the permissible dot shift amount per scan line is not more than half of resolution in a sub-scanning direction.

The multi-beam scanning optical system according to another aspect of the invention comprises correction means for relatively shifting a focus position in the main scanning section of the beams guided to said synchronism detector in a direction of the optical axis of said synchronism-detecting optical means from said slit surface.

The multi-beam scanning optical system according to another aspect of the invention comprises correction means for moving the position of said slit surface or a unit including the slit surface in a direction of the optical axis of said synchronism-detecting optical means.

In the multi-beam scanning optical system according to another aspect of the invention, said lens section is disposed in an optical path between said deflecting means and said slit surface, and the optical system comprises correction means for moving said lens section in a direction of the optical axis of said synchronism-detecting optical means.

A multi-beam scanning optical system according to a further aspect of the invention is a multi-beam scanning optical system comprising incidence optical means for guiding a plurality of beams emitted from light source means having a plurality of light-emitting regions spaced apart from each other in a main scanning direction, to deflecting means; scanning optical means for focusing the plurality of beams deflected by the deflecting means, on a surface to be scanned, to form a plurality of scan lines; and synchronism-detecting optical means for converging part of the plurality of beams deflected by the deflecting means, on a slit surface by a lens section, thereafter guiding the beams to a synchronism detector, and controlling timing of a scan start position on the surface to be scanned for each of the plurality of beams by use of a signal from the synchronism detector;

where $\delta M1$ is a defocus amount in a main scanning section of the beams guided to the synchronism detector and in a view from the slit surface and $\delta X$ is a defocus amount at each image height on the surface to be scanned, said multi-beam scanning optical system comprising correction means for correcting a dot shift per scan line on the surface to be scanned, which occurs because of a difference between the two defocus amounts $\delta M1$, $\delta X$.

In the multi-beam scanning optical system according to another aspect of the invention, said dot shift is not more than half of resolution in a sub-scanning direction.

In the multi-beam scanning optical system according to another aspect of the invention, said plurality of light-emitting regions are spaced apart from each other in the main scanning direction and in the sub-scanning direction.

In the multi-beam scanning optical system according to another aspect of the invention, a slit in said slit surface is inclined in the sub-scanning direction according to the dot shift per scan line on said surface to be scanned.

The multi-beam scanning optical system according to another aspect of the invention comprises rotating means for rotating said slit surface or a unit including the slit surface about the optical axis of the synchronism-detecting optical means according to the dot shift per scan line on said surface to be scanned.

A multi-beam scanning optical system according to a further aspect of the invention is a multi-beam scanning optical system comprising incidence optical means for guiding a plurality of beams emitted from light source means having a plurality of light-emitting regions spaced apart from each other in a main scanning direction, to deflecting means; scanning optical means for focusing the plurality of beams deflected by the deflecting means, on a surface to be scanned; and synchronism-detecting optical means for guiding part of the plurality of beams deflected by the deflecting means, to a synchronism detector by a lens section and controlling timing of a scan start position on the surface to be scanned by use of a signal from the synchronism detector, wherein, where $\delta M2$ is a defocus amount in a main scanning section of the beams guided to the synchronism detector and in a view from a photoreceptive surface of said synchronism detector and $\delta X$ is a defocus amount at each image height on the surface to be scanned, the following condition is satisfied:

$$|\delta X - \delta M2| \leq \delta Y\text{max}/\theta\text{max}$$

(where $\delta Y$max: permissible dot shift amount per scan line;

$\theta$max: maximum angle difference between angles of incidence to the photoreceptive surface of the beams used for detection of synchronism).

In the multi-beam scanning optical system according to another aspect of the invention, the permissible dot shift amount per scan line is not more than half of resolution in a sub-scanning direction.

The multi-beam scanning optical system according to another aspect of the invention comprises correction means for relatively shifting a focus position in the main scanning direction of the beams guided to said synchronism detector in a direction of the optical axis of said synchronism-detecting optical means from the photoreceptive surface of the synchronism detector.

The multi-beam scanning optical system according to another aspect of the invention comprises correction means for moving the position of said synchronism detector or a unit including the synchronism detector in a direction of the optical axis of said synchronism-detecting optical means.

In the multi-beam scanning optical system according to another aspect of the invention, said lens section is disposed in an optical path between said deflecting means and said synchronism detector, and the optical system comprises correction means for moving said lens section in a direction of the optical axis of said synchronism-detecting optical means.

An image forming apparatus according to one aspect of the invention is an image forming apparatus comprising the multi-beam scanning optical system as described above; a photosensitive member placed on said surface to be scanned; a developing unit for developing an electrostatic latent image formed on said photosensitive member with scanning light by said multi-beam scanning optical system, into a toner image; a transfer unit for transferring said developed toner image onto a transfer medium; and a fixing unit for fixing the transferred toner image on the transfer medium.

An image forming apparatus according to another aspect of the invention is an image forming apparatus comprising the multi-beam scanning optical system as described above; and a printer controller for converting code data supplied from an external device, into an image signal and entering the image signal into said multi-beam scanning optical system.

BRIEF DESCRIPTION OF THE DRAWINGS

FIGS. 16A and 16B are explanatory diagrams to show the positional relation between beams before the focus is shifted to this side (toward the deflecting means);

FIGS. 17A and 17B are explanatory diagrams to show the positional relation between beams after the focus is shifted to this side (toward the deflecting means);

FIGS. 18A, 18B and 18C are explanatory diagrams to show the positional relation between beams after the focus is shifted to this side (toward the deflecting means);

FIGS. 21A, 21B and 21C are explanatory diagrams to show the positional relation between beams after the focus is shifted to that side (away from the deflecting means);

DETAILED DESCRIPTION OF THE PREFERRED EMBODIMENTS

[Embodiment 1]

Figure 1:
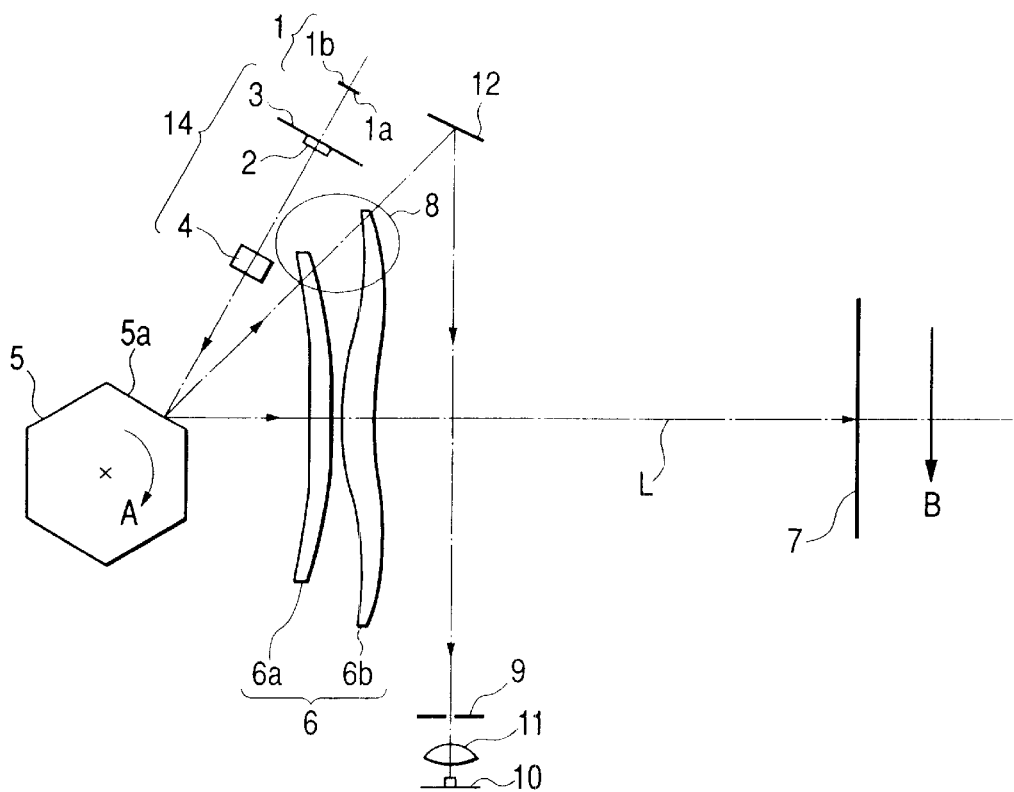
FIG. 1 is a cross-sectional view along the main scanning direction of Embodiment 1 of the present invention.

FIG. 1 is the principal, cross-sectional view in the main scanning direction (main scanning section view) of an application where the multi-beam scanning optical system of Embodiment 1 of the present invention is applied to the image forming apparatus such as the laser beam printer (LBP) or the like.

In the present specification, a plane formed by the optical axis of the scanning optical means and the beams deflected by the optical deflector is defined as a main scanning section, and a plane including the optical axis of the-scanning optical means and being perpendicular to the main scanning section, as a sub-scanning section.

Figure 2:
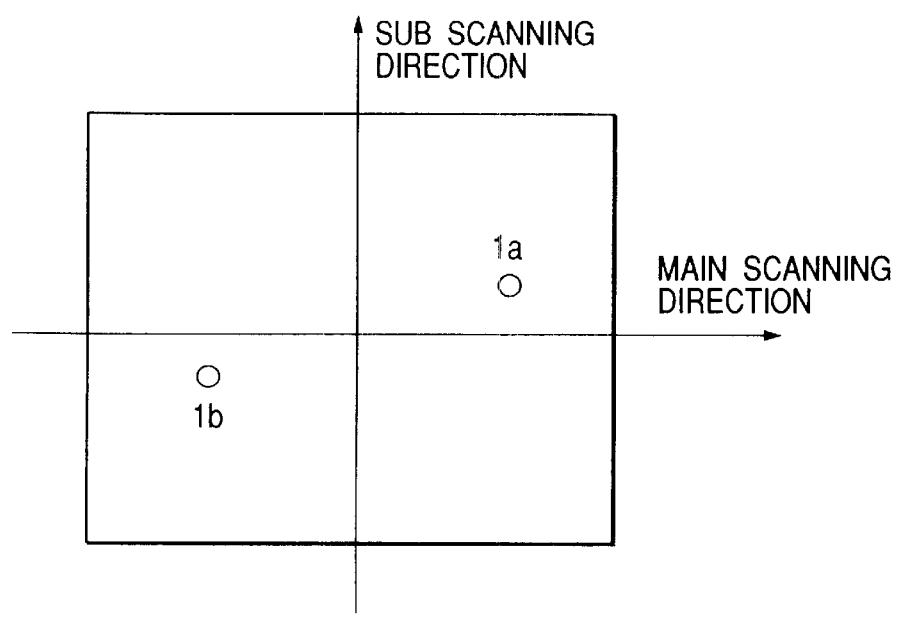
FIG. 2 is an explanatory diagram to show arrangement of the light-emitting regions.

In the same figure, numeral 1 designates a light source unit (light source means), for example, which has two light-emitting regions (light sources) 1a, 1b of semiconductor laser. The light source unit may include three or more light-emitting regions. The two light-emitting regions 1a, 1b are spaced from each other in the main scanning direction and in the sub-scanning direction as illustrated in FIG. 2. As shown in FIG. 2, the distance between the light-emitting regions is longer in the main scanning direction than in the sub-scanning direction. This is because the actual distance between the light-emitting regions is longer than the actually necessary distance between the light-emitting regions in the sub-scanning direction and the distance between the light-emitting regions in the sub-scanning direction is set to a desired value by rotating the light source unit 1 provided with the two light-emitting regions 1a, 1b. Numeral 3 denotes an aperture stop, which shapes the beams emitted from the respective light-emitting regions 1a, 1b into a desired optimal beam shape. Numeral 2 represents a collimator lens, which converts the beams having passed through the aperture stop 3, into nearly parallel beams. Numeral 4 indicates a cylindrical lens, which has a predetermined refractive power only in the sub-scanning direction. Each of such elements as the aperture stop 3, the collimator lens 2, and the cylindrical lens 4 composes an element of the incidence optical means 14.

Numeral 5 denotes an optical deflector as a deflecting means, which is comprised, for example, of a rotary polygon mirror and which is rotated at a constant speed in the direction of the arrow A in the drawing by the driving means such as a motor or the like (not illustrated). Numeral 6 indicates a scanning optical means having the f-θ characteristic, which is comprised of two optical elements (f-θ lenses) 6a, 6b as first and second optical elements and which focuses a plurality of beams deflected by the optical deflector into the spot shape on the surface to be scanned, to form a plurality of scan lines. The scanning optical means 6 establishes the conjugate relation between the vicinity of the deflecting facet 5a of the optical deflector 5 and the vicinity of the photosensitive drum surface 7 in the sub-scanning section, thereby having the function of correcting inclination.

Numeral 8 stands for a lens section for detection of synchronism, which focuses (or condenses) a plurality of beams (BD beams) for detection of synchronous signals onto the surface of slit plate 9 provided in the vicinity of the synchronism detector 10 described hereinafter. Although the lens section 8 in the present embodiment is made in an integral form with the scanning optical means 6, the lens section 8 may also be provided independently from the scanning optical means 6. Numeral 12 designates a return mirror (hereinafter referred to as a "BD mirror"), which reflects a plurality of BD beams for adjusting the timing of the scan start positions on the photosensitive drum surface 7, toward the synchronism detector 10 described hereinafter. This BD mirror 12 is located on the side of the incidence optical means 14 with respect to the optical axis L of the scanning optical means 6. Numeral 9 denotes the slit plate for detection of synchronism (hereinafter referred to as a "BD slit plate"), which is located at the position equivalent to the photosensitive drum surface 7 and which determines the writing start positions of images. Numeral 11 represents an imaging lens (hereinafter referred to as a "BD lens"), which is provided for establishing the conjugate relation between the BD mirror 12 and the synchronism detector 10 and which corrects surface inclination of the BD mirror 12. Numeral 10 represents a photosensor (hereinafter referred to as a "BD sensor") as a synchronism detector, which detects an output signal from the BD sensor 10 and which adjusts the timing of the scan start position of image recording onto the photosensitive drum surface 7 for each of the BD beams by use of the synchronous signals (BD signals) obtained by the detection.

Each of such elements as the lens section 8, the BD mirror 12, the BD slit 9, the BD lens 11, and the BD sensor 10 constitutes an element of the synchronism-detecting optical means (BD optical system).

In the present embodiment the two beams, optically modulated according to image information and emitted from the light source unit 1, are restricted in the size of the beam section by the aperture stop 3 and converted into nearly parallel beams by the collimator lens 2 to enter the cylindrical lens 4. The beams entering the cylindrical lens 4 emerge as they are, in the main scanning direction. The beams are converged in the sub-scanning section to be focused as almost linear images (linear images longitudinal in the main scanning direction) on the deflecting facet 5a of the optical deflector 5. The two beams reflectively deflected by the deflecting facet 5a of the optical deflector 5 are focused in the spot shape on the photosensitive drum surface 7 by the scanning optical means 6 and optically scan the photosensitive drum surface 7 at an equal speed in the direction of an arrow B (in the main scanning direction) while rotating the optical deflector 5 in the direction of the arrow A. This causes an image to be recorded on the photosensitive drum surface 7 being a recording medium.

At this time, in order to adjust the timing of the scan start positions on the photosensitive drum surface 7 prior to the optical scanning on the photosensitive drum surface 7, part of the two beams reflectively deflected by the optical deflector 5 are converged via the BD mirror 12 onto the surface of the BD slit plate 9 by the lens section 8 and thereafter they are guided through the BD lens 11 to the BD sensor 10. Then the timing of the scan start position for recording of image onto the photosensitive drum surface 7 is adjusted for each of the BD beams by use of the synchronous signals (BD signals) obtained by detecting the output signals from the BD sensor 10.

If at this time there is a deviation between the focus position of the BD beams on the surface of the BD slit plate 9 and the focus position of the scanning beams on the surface to be scanned 7 for the various reasons as described previously, there will arise the problem of the deviation between the start positions of the A- and B-beams and the problem that the spacing in the main scanning direction between the A- and B-beams during scanning varies to deteriorate the printed image, as discussed previously.

In the present embodiment the elements are set so as to satisfy Condition (A) presented below. Namely, where δM is the defocus amount in the main scanning section of the BD beams guided to the BD sensor 10 and in a view from the BD slit 9 and δX the defocus amount at each image height on the surface to be scanned 7, the following condition is satisfied:

$$|\delta X - \delta M| \leq \delta Y\max/\theta\max \tag{A}$$

(where

δYmax: permissible dot shift

θmax: maximum angle difference [rad] between incident angles of the BD beams to the BD slit plate when the BD beams corresponding to the respective light-emitting regions start entering the BD sensor).

An example of specific numerals is as follows: where the resolution is 1200 dpi in the sub-scanning direction, δYmax=10 μm, and θmax=0.5 [rad], the maximum of |δX−δM| is set to 1.15 mm. This permits the present embodiment to implement the high-quality printing at high speed. In the present embodiment the permissible dot shift (the deviation between the start positions of respective scan lines) δYmax is set to not more than half of the resolution in the sub-scanning direction.

In the present embodiment each of the beams emitted from the light source unit 1 is converted into a nearly parallel beam by the collimator lens 2, but, without having to be limited to this, the same effect can also be achieved, for example, by converting each beam into a converging beam or into a diverging beam.

The following describes the reason why the permissible dot shift amount per scan line is preferably not more than half of the resolution in the sub-scanning direction.

Supposing the number of light sources is 2 and the dot shift is one dot, an image one dot before or after will be printed at an original printing position; this will result in printing at originally-not-to-be-printed positions and non-printing at to-be-printed positions, thereby making the printed state very hard to look.

In consideration of the above phenomenon the dot shift is desirably 0, but it is very difficult to realize it in practice. If the dot shift is small, specifically, not more than a half dot (about 10 µm in the case of 1200 dpi), an image printed in practice can be observed without feeling difficulties in view. If the dot shift is over a half dot on the other hand, it will gradually become recognizable by the eye, though depending upon the actually printed image, and the printed state cannot be said as a good state.

The above description was given by limiting the number of light sources to two in order to make the story not too complex, but this phenomenon occurs regardless of the number of light sources and thus the maximum of the dot shift needs to be not more than a half dot.

In the present embodiment a period of time from generation of the output signal from the BD sensor 10 with incidence of the A-beam into the BD sensor 10 to the start of printing on the photosensitive drum 7 is equalized to that from generation of the output signal from the BD sensor 10 with incidence of the B-beam into the BD sensor 10 to the start of printing on the photosensitive drum 7.

The above embodiment was described in the case of use of the two laser beams, but the number of laser beams may be three or more.

Next described is an image forming apparatus to which the present invention is applied.

Figure 31:
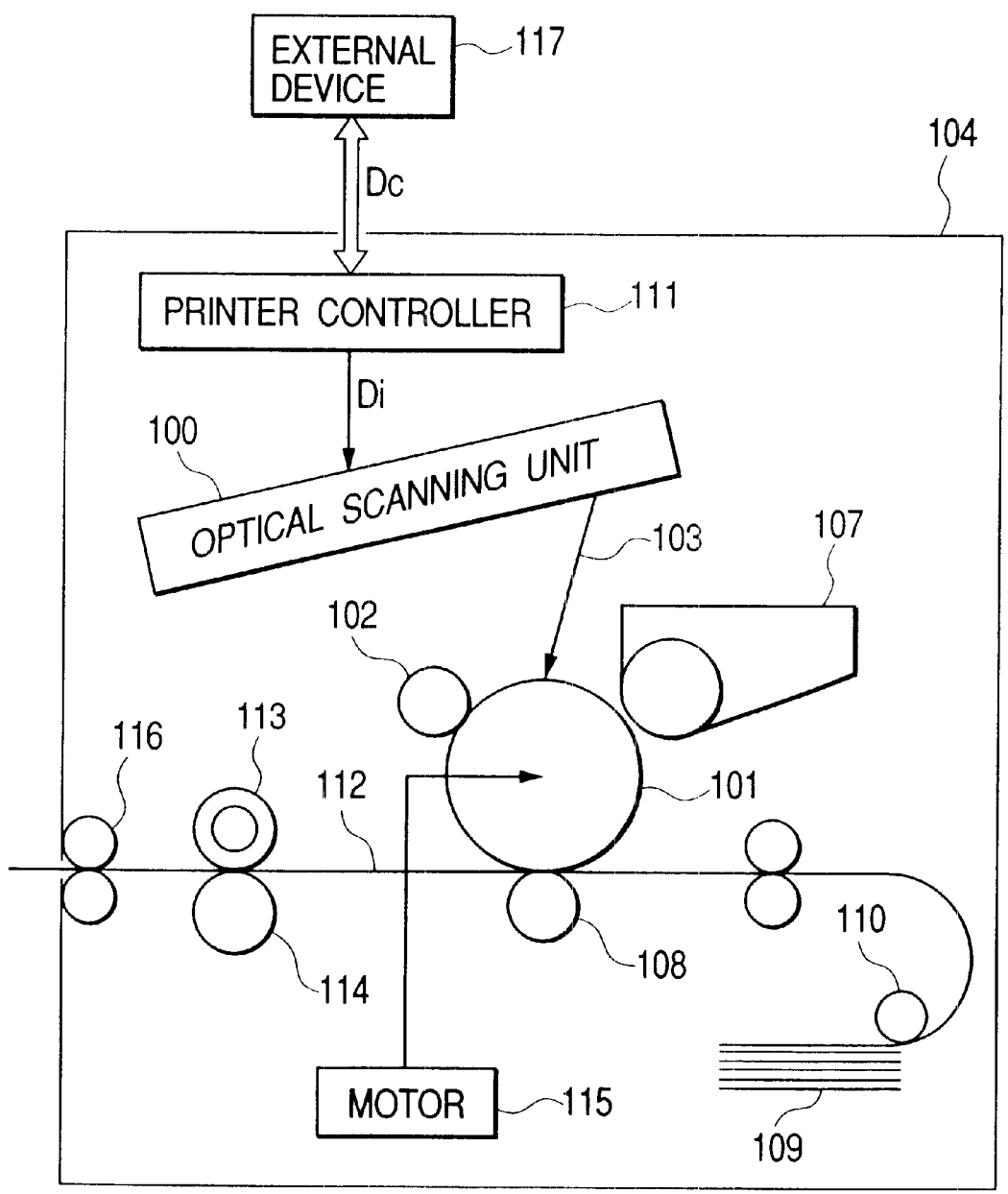
FIG. 31 is a schematic diagram to show an image forming apparatus of the present invention.

FIG. 31 is a principal, cross-sectional view in the sub-scanning direction to show an embodiment of the image forming apparatus of the present invention. In FIG. 31, numeral 104 designates the image forming apparatus. Code data Dc is entered from an external device 117 such as a personal computer or the like into this image forming apparatus 104. This code data Dc is converted into image data (dot data) Di by a printer controller 111 in the apparatus. This image data Di is supplied to an optical scanning unit 100 having the structure presented in either of Embodiments 1 to 6. Then this optical scanning unit 100 emits light beams 103 modulated according to the image data Di and the light beams 103 scan the photosensitive surface of the photosensitive drum 101 in the main scanning direction.

The photosensitive drum 101 being an electrostatic latent image carrier (photosensitive member) is rotated clockwise by motor 115. With this rotation, the photosensitive surface of the photosensitive drum 101 moves in the sub-scanning direction perpendicular to the main scanning direction with respect to the light beams 103. A charging roller 102 for uniformly charging the surface of the photosensitive drum 101 is disposed above the photosensitive drum 101 so as to be in contact with the surface of the photosensitive drum. The surface of the photosensitive drum 101 charged by the charging roller 102 is illuminated with the light beams 103 under scanning by the optical scanning unit 100.

As described previously, the light beams 103 are modulated based on the image data Di, and the electrostatic latent image is formed on the surface of the photosensitive drum 101 by the illumination with the light beams 103. This electrostatic latent image is developed into a toner image by a developing unit 107 disposed in contact with the photosensitive drum 101 and downstream in the rotating direction of the photosensitive drum 101 from the illumination position of the light beams 103.

The toner image developed by the developing unit 107 is transferred onto a sheet 112 of a transfer medium by a transfer roller 108 located below the photosensitive drum 101 and opposite to the photosensitive drum 101. Sheets 112 are set in a sheet cassette 109 in front of the photosensitive drum 101 (on the right side in FIG. 31), but a sheet can also be fed by manual feeding. A feed roller 110 is disposed at an end of the sheet cassette 109 and feeds each sheet 112 in the sheet cassette 109, into the transfer path.

A sheet 112 after transfer of a not-yet-fixed toner image as described above, is further conveyed to a fixing unit behind the photosensitive drum 101 (on the left side in FIG. 31). The fixing unit is composed of a fixing roller 113 having a fixing heater (not illustrated) inside and a press roller 114 set in press contact with the fixing roller 113. The sheet 112 having conveyed from the transfer section is heated under pressure at the nip part between the fixing roller 113 and the press roller 114, whereby the unfixed toner image is fixed on the sheet 112. Discharge rollers 116 are disposed further behind the fixing roller 113 and discharge the sheet 112 after the fixing to the outside of the image forming apparatus.

Although not illustrated in FIG. 31, the print controller 111 also performs control of each of sections in the image forming apparatus, including the motor 115, and the control of the polygon motor etc. in the optical scanning unit described hereinafter, in addition to the conversion of the data described above.

[Embodiment 2]

Figure 3:
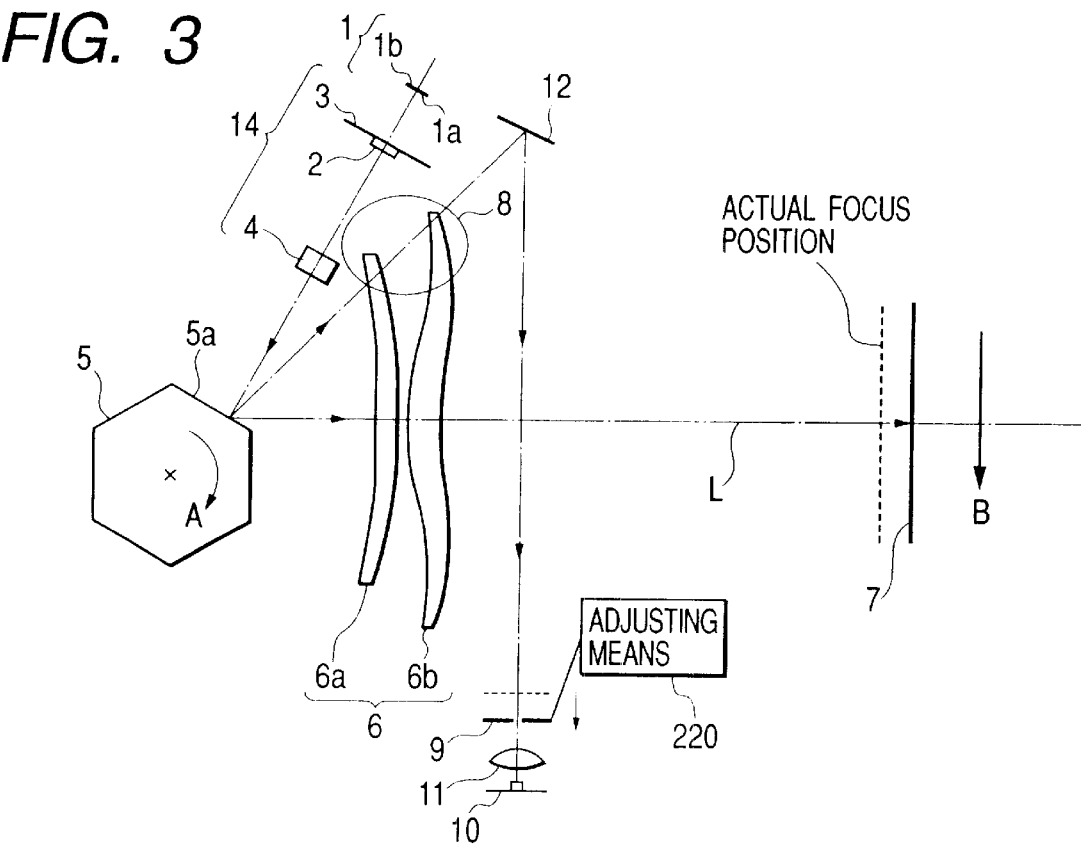
FIG. 3 is a cross-sectional view along the main scanning direction of Embodiment 2 of the present invention.

FIG. 3 is a principal, cross-sectional view in the main scanning direction (main scanning section view) of an application where the multi-beam scanning optical system of Embodiment 2 of the present invention is applied to the image forming apparatus such as the laser beam printer (LBP) or the like. In the same figure the same elements as those illustrated in FIG. 1 are denoted by the same reference symbols.

The present embodiment is different from Embodiment 1 described above in that Condition (A) is satisfied by relatively shifting the focus position in the main scanning section of the BD beams guided to the BD sensor 10 in the direction of the optical axis of the BD optical system from the BD slit plate 9. The other structure and optical action are almost the same as in Embodiment 1, thereby accomplishing the same effect.

Namely, in the case where degrees of curvature of field of the scanning optical means 6 are considerably stable among products and where the difference $|\delta X - \delta M|$ in Condition (A) is an unignorable value with placement of the BD slit plate 9 at the focus position, the BD slit plate 9 is shifted from the focus position in the direction of the optical axis of the BD optical system by an adjusting means (FIG. 30) from the beginning, as illustrated in FIG. 3, whereby Condition (A) is satisfied. This permits the present embodiment to implement the high-quality printing at high speed.

Next described is the dot shift adjusting means employed in the present invention.

Figure 30:
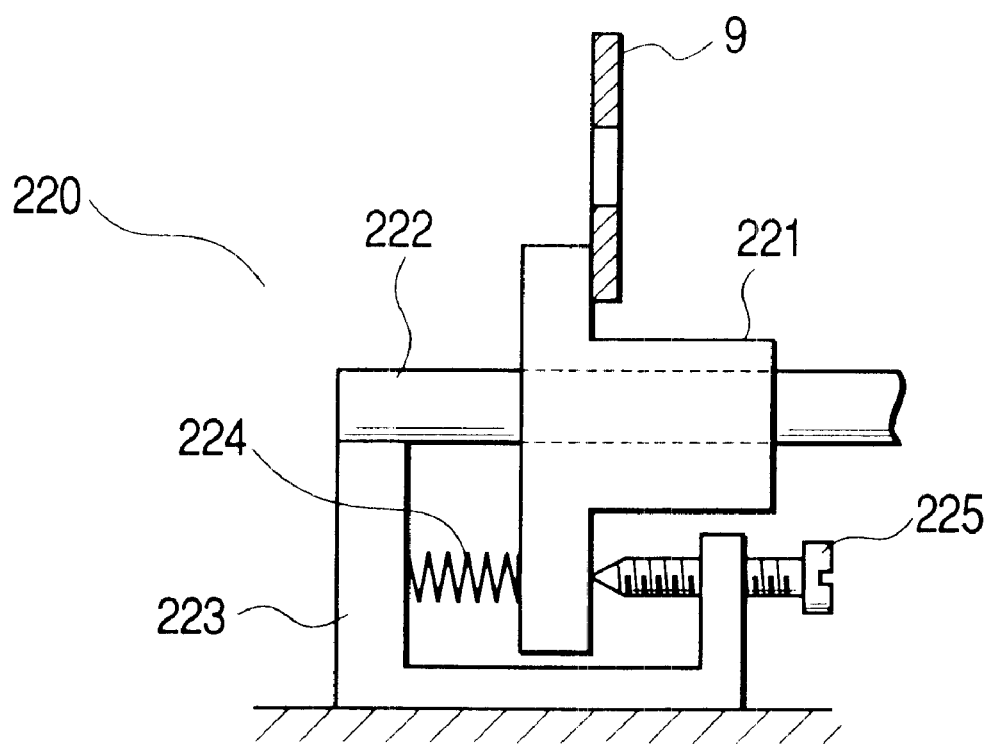
FIG. 30 is an explanatory diagram to show an adjusting means of the present invention.

The BD slit plate 9 can be moved in the direction of the optical axis of the cylinder lens 11 by the adjusting means 220 constituting the multi-beam scanning optical system of the present invention. Specifically, as illustrated in FIG. 30, the BD slit plate 9 is fixed to a support member 221 with an adhesive or the like. The support member 221 is fitted on a guide 222 so as to be movable in the direction of the optical axis. A holder 223 is fixed in the image forming apparatus.

The guide 222 is fixed to the holder 223 of "U-shape" fixed to a stationary member in the apparatus. A compressive spring 224 is interposed between the holder 223 and the support 221 to exert a resilient force toward the right in the drawing on the support member 221. An adjusting screw 225 in mesh with the holder 223 stops movement of the support member under the resilient force of the spring 224 with keeping the tip part in contact with the adjusting means 220 from the right. Therefore, the support member 221 can be displaced to the left in the drawing by feeding the adjusting screw 225 or to the right by loosening the adjusting screw 225. The position of the BD slit plate 9 is adjusted by such movement in the direction of the optical axis as to satisfy Condition (A), based on the measured deviation δY between the start positions of the A- and B-beams on the surface to be scanned.

[Embodiment 3]

Figure 4:
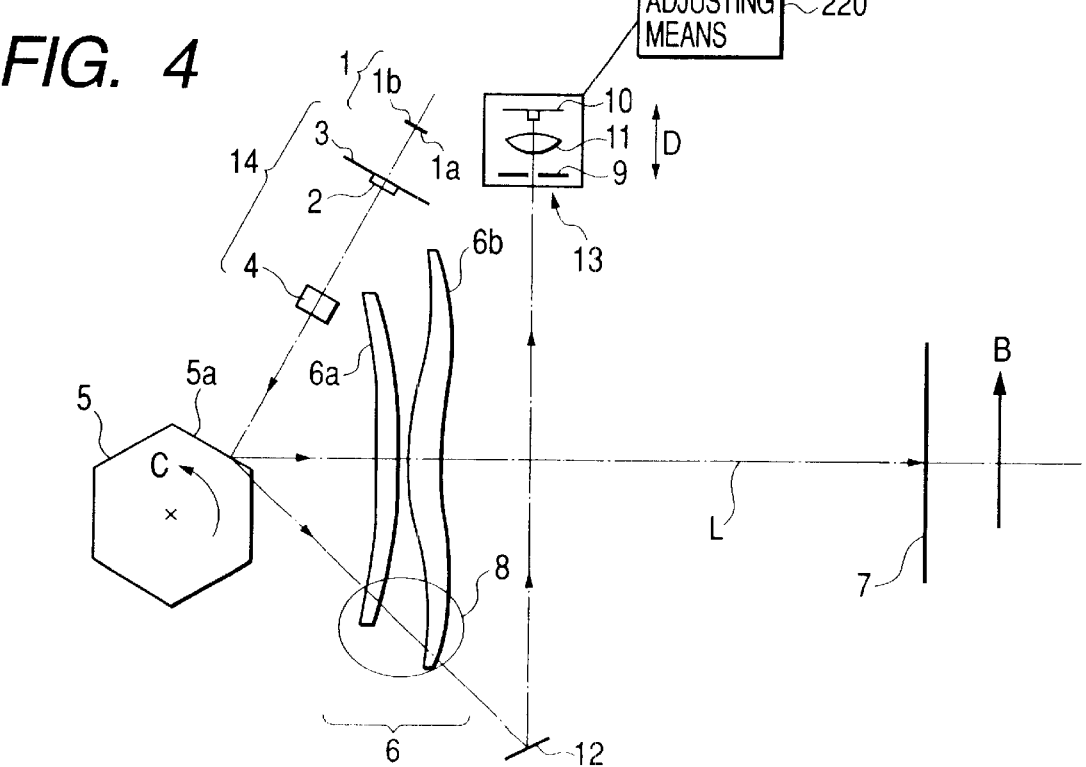
FIG. 4 is a cross-sectional view along the main scanning direction of Embodiment 3 of the present invention.

FIG. 4 is a principal, cross-sectional view in the main scanning direction (main scanning section view) of an application where the multi-beam scanning optical system of Embodiment 3 of the present invention is applied to the image forming apparatus such as the laser beam printer (LBP) or the like. In the same figure the same elements as those illustrated in FIG. 1 are denoted by the same reference symbols.

The present embodiment is different from Embodiment 1 described above in that Condition (A) is satisfied by moving a unit 13 including the BD slit plate 9 in the direction of the optical axis of the BD optical system and in that the optical deflector is designed to rotate in the opposite rotating direction (i.e., in the direction of an arrow C in the drawing). The other structure and optical action are approximately the same as in Embodiment 1, thereby accomplishing the same effect.

Namely, in the present embodiment the optical deflector 5 is rotated at a constant speed in the direction of the arrow C in the drawing, opposite to the rotating direction in Embodiment 1, by the driving means such as a motor or the like (not illustrated). This is a solution to a space problem that the synchronism-detecting optical means (BD optical system) cannot be placed between the scanning optical means 6 and the incidence optical means 14.

At this time, if there is a deviation between the focus position of each BD beam on the surface of the BD slit plate 9 and the focus position of the scanning beams on the surface to be scanned 7 as in Embodiment 1, there will arise the problem that deviation occurs between the start positions of the A- and B-beams and the problem that the spacing in the main scanning direction between the A- and B-beams under scanning varies to deteriorate the printed image.

Particularly, since in the present embodiment δYmax=6 μm and θmax=0.5 [rad] in order to accomplish higher image quality, the difference |δX−δM| in Condition (A) needs to be set to not more than 0.69 mm and it is very difficult to construct the multi-beam scanning optical systems of this optical performance without adjustment, on a stable basis.

In the present embodiment, therefore, the converging state is adjusted in the main scanning section of the BD beams on the surface of the BD slit plate 9 by moving the unit 13 including the BD slit plate 9 in the direction of the optical axis of the BD optical system as indicated by arrows D illustrated in FIG. 4, by the adjusting means (FIG. 30), whereby the converging state is improved, for example, from the state illustrated in FIG. 17B to the state illustrated in FIG. 18B. This allows the system to satisfy the above specification, i.e., Condition (A) and thus implement the high-quality printing at high speed.

[Embodiment 4]

Figure 5:
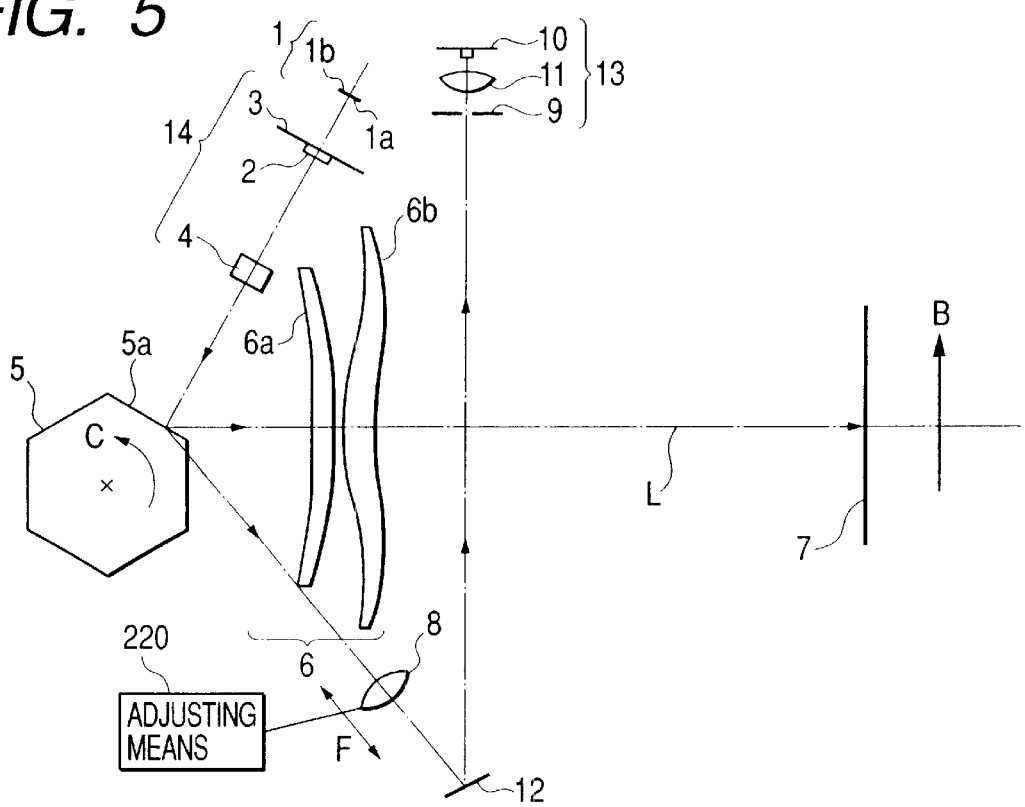
FIG. 5 is a cross-sectional view along the main scanning direction of Embodiment 4 of the present invention.

FIG. 5 is a principal, cross-sectional view in the main scanning direction (main scanning section view) of an application where the multi-beam scanning optical system of Embodiment 4 of the present invention is applied to the image forming apparatus such as the laser beam printer (LBP) or the like. In the same figure the same elements as those illustrated in FIG. 4 are denoted by the same reference symbols.

The present embodiment is different from Embodiment 3 described above in that the BD slit plate 9 and the unit 13 including the BD slit plate 9 are fixed, the lens section 8 is provided independently without being integrated with the scanning optical system 6 in order to shorten the shape in the main scanning direction of the first and second optical elements (f-θ lenses) 6a, 6b constituting the scanning optical means 6, and Condition (A) is satisfied by moving the lens section 8 in the direction of the optical axis of the BD optical system. The other structure and optical action are approximately the same as in Embodiment 3, thereby accomplishing the same effect.

Namely, in the present embodiment the BD slit plate 9 and the unit 13 including the BD slit plate 9 are fixed and the lens section 8 consisting of a single lens is constructed separately without being integrated with the scanning optical means 6. At this time, if deviation occurs between the focus position of each BD beam on the surface of the BD slit plate 9 and the focus position of the scanning beams on the surface to be scanned 7 as in Embodiment 1, there will arise the problem that the deviation appears between the start positions of the A- and B-beams and the problem that the spacing in the main scanning direction between the A- and B-beams under scanning varies to deteriorate the printed image, as described previously.

In the present embodiment, therefore, the converging state in the main scanning section of the BD beams is adjusted on the surface of the BD slit plate 9 by moving the lens section 8 in the direction of the optical axis of the BD optical system as indicated by arrows F in the drawing, by the adjusting means (FIG. 30), whereby aforementioned Condition (A) is satisfied, so as to implement the high-quality printing.

In the case where degrees of curvature of field of the scanning optical means 6 are considerably stable among products and where the difference |δX−δM| in Condition (A) is an unignorable value with placement of the BD slit plate 9 at the focus position in the present embodiment, the focus position may be changed in the main scanning section by preliminarily shifting the position of the lens section 8 on the optical axis, so as to satisfy Condition (A).

[Embodiment 5]

Figure 6:
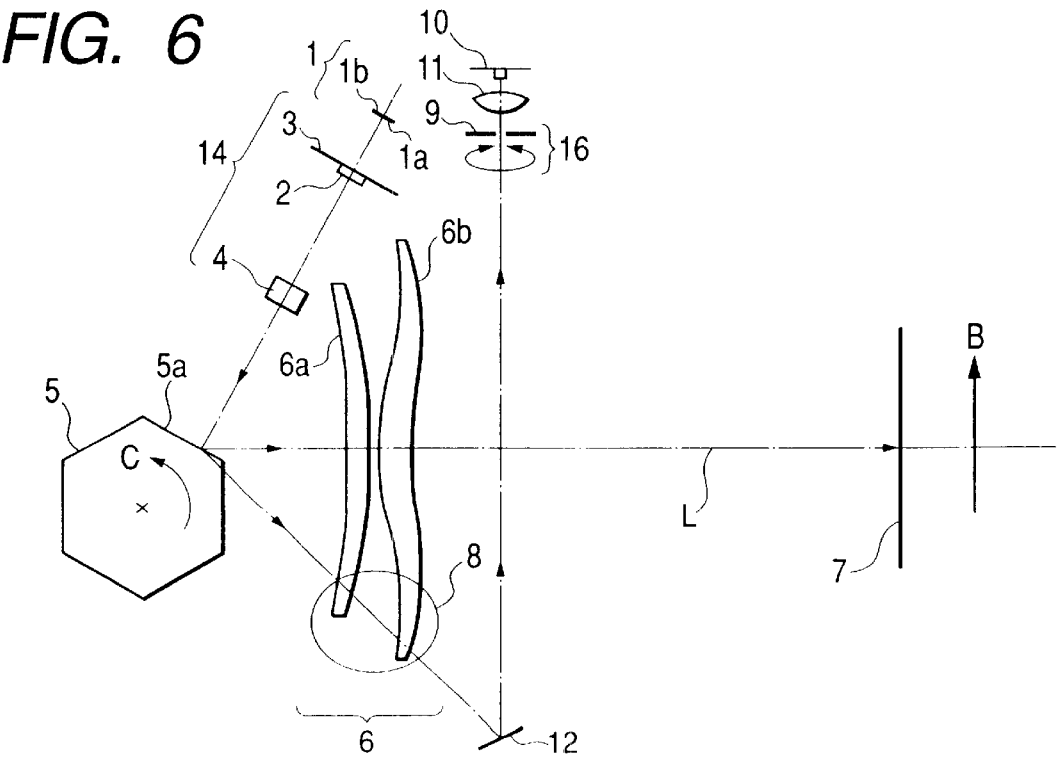
FIG. 6 is a cross-sectional view along the main scanning direction of Embodiment 5 of the present invention.

FIG. 6 is a principal, cross-sectional view in the main scanning direction (main scanning section view) of an application where the multi-beam scanning optical system of Embodiment 5 of the present invention is applied to the image forming apparatus such as the laser beam printer (LBP) or the like. In the same figure the same elements as those illustrated in FIG. 1 are denoted by the same reference symbols.

Figure 7:
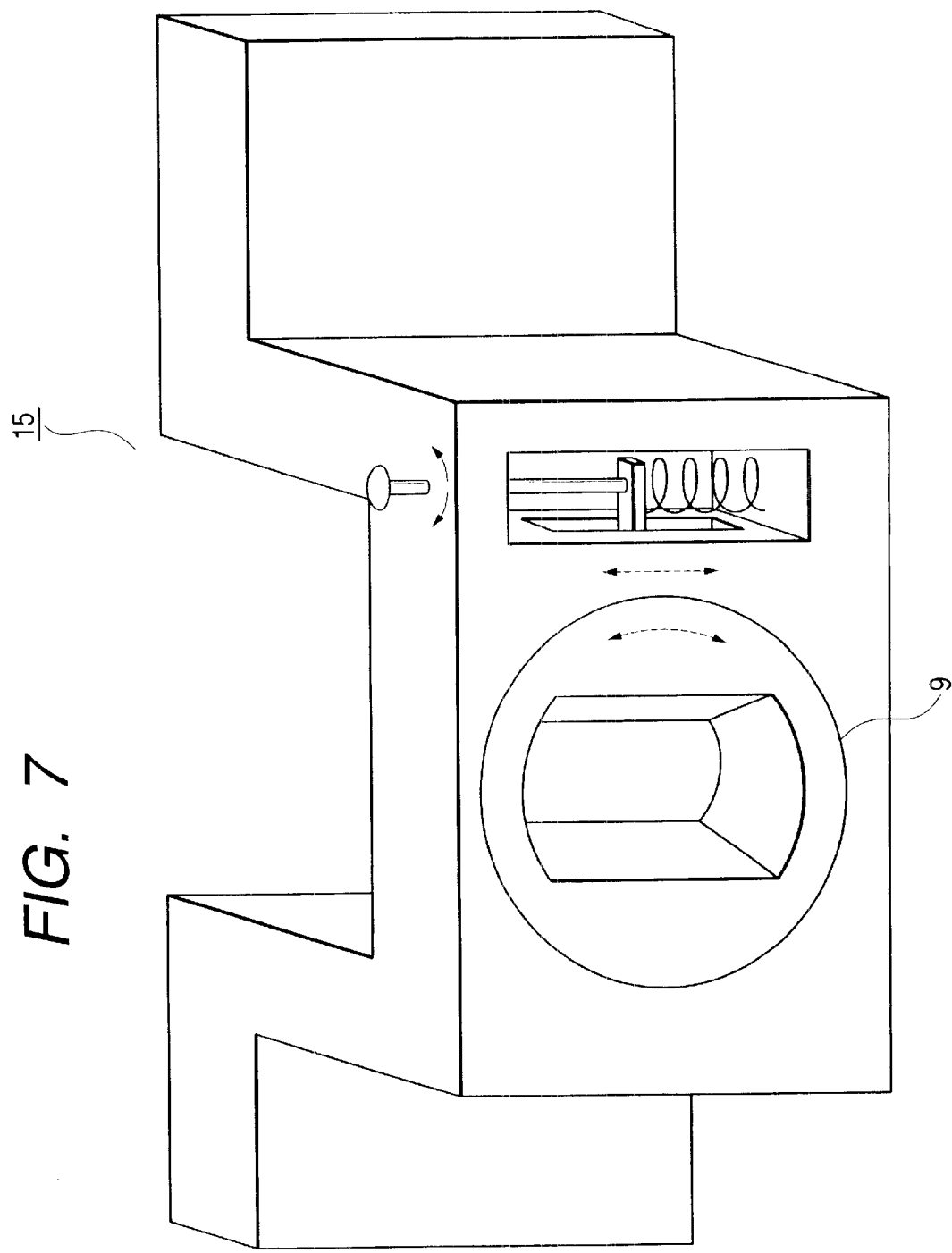
FIG. 7 is a diagram to show an angle adjusting means in Embodiment 5 of the present invention.

In the present embodiment the dot shift due to the difference between the two defocus amounts δM, δX, which are the defocus amount δM in the main scanning section of the BD beams guided to the BD sensor 10 and in the view from the BD slit plate 9 and the defocus amount δX at each image height on the surface to be scanned 7, is corrected by rotationally adjusting the BD slit plate 9 or a unit 16 including the BD slit plate 9 about the optical axis of the BD optical system by an angle adjusting means 15 as a correction means illustrated in FIG. 7.

Specifically, the light source unit 1 in the present embodiment is constructed in such structure that the light-emitting regions 1a, 1b are also spaced from each other in the sub-scanning direction as illustrated in aforementioned FIG. 2 and that the A- and B-beams corresponding to the respective light-emitting regions 1a, 1b pass different positions in the sub-scanning direction.

Figure 8A:
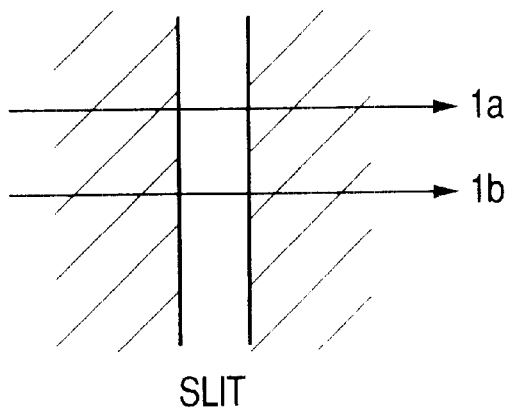
FIGS. 8A and 8B are explanatory diagrams to illustrate inclination of the slit and the printing positions (before adjustment) of the respective beams in Embodiment 5 of the present invention.
Figure 8B:
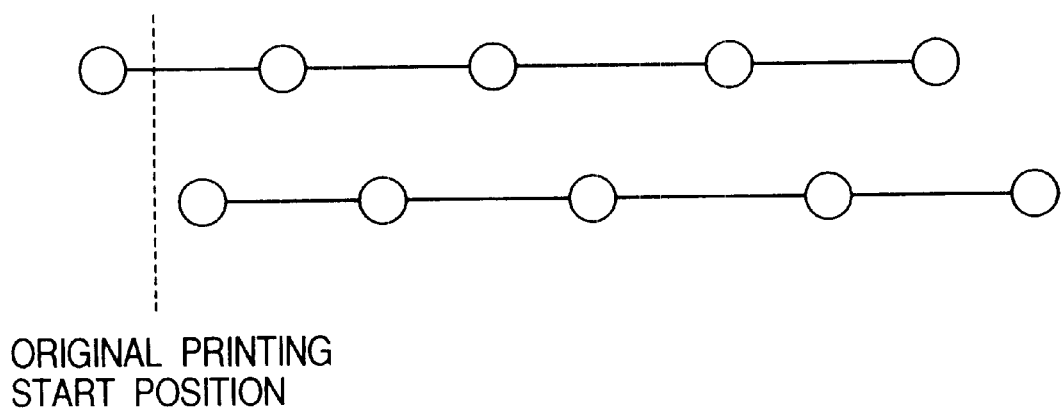
Figure 9A:
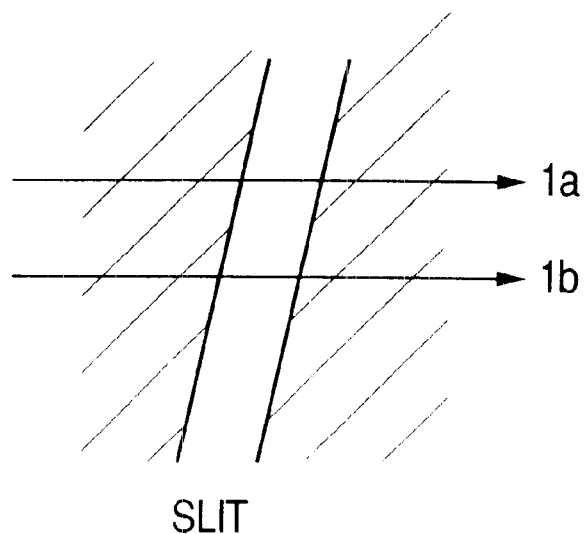
FIGS. 9A and 9B are explanatory diagrams to illustrate inclination of the slit and the printing positions (after adjustment) of the respective beams in Embodiment 5 of the present invention.
Figure 9B:
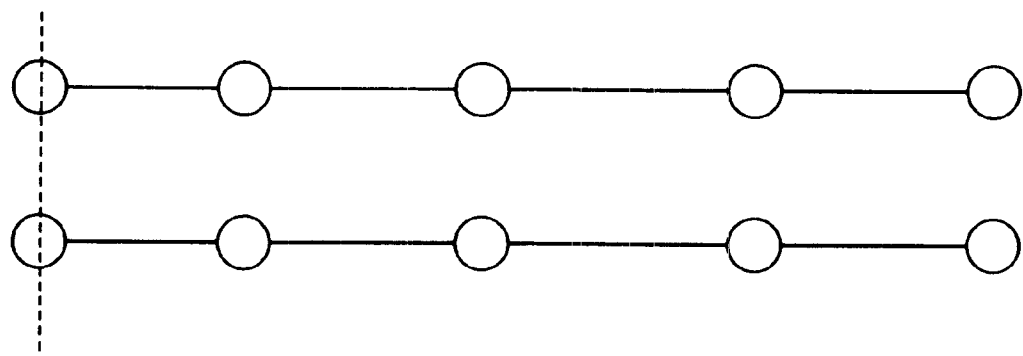

In the present embodiment, therefore, the BD slit plate 9 is rotated, as illustrated in FIGS. 8A, 8B and FIGS. 9A, 9B, by the angle adjusting means 15, thereby varying the time when the B-beam starts entering the BD sensor 10, relative to the A-beam. FIGS. 8A, 8B are explanatory diagrams to show inclination of the BD slit plate 9 and the printing positions (before adjustment) of the respective beams, and FIGS. 9A and 9B explanatory diagrams to show inclination of the BD slit plate 9 and the printing positions (after adjustment) of the respective beams.

In the present embodiment, as described above, the dot shift, which inevitably occurred before because of the difference between the two defocus amounts δM, δX, i.e., the defocus amount δM in the main scanning section of each BD beam guided to the BD sensor 10 and the defocus amount δX at each image height on the surface to be scanned 7 as described above, is corrected (or canceled) by rotationally adjusting the BD slit plate 9 by use of the angle adjusting means 15. This permits the present embodiment to implement the high-quality printing at high speed.

The optical action for formation of image using the multi-beam scanning optical system in the present embodiment is approximately the same as in Embodiment 1 described previously.

[Embodiment 6]

Figure 10:
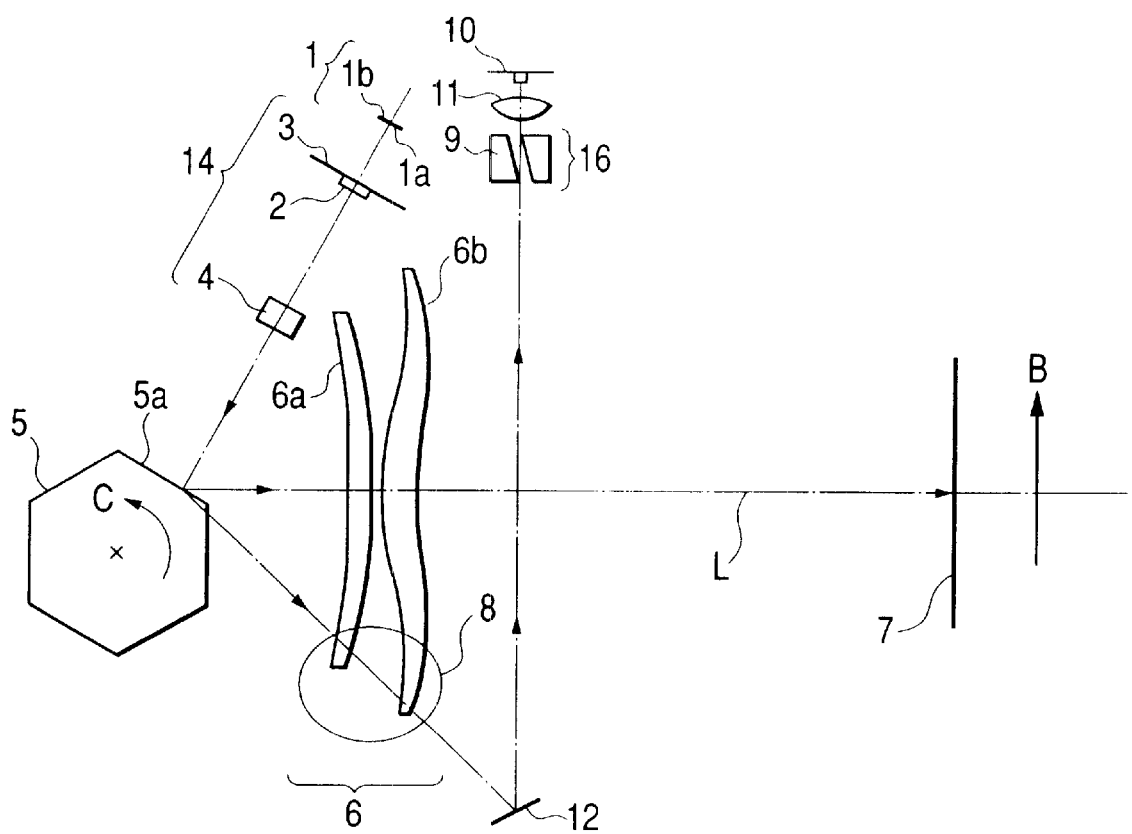
FIG. 10 is a cross-sectional view along the main scanning direction of Embodiment 6 of the present invention.
Figure 11A:
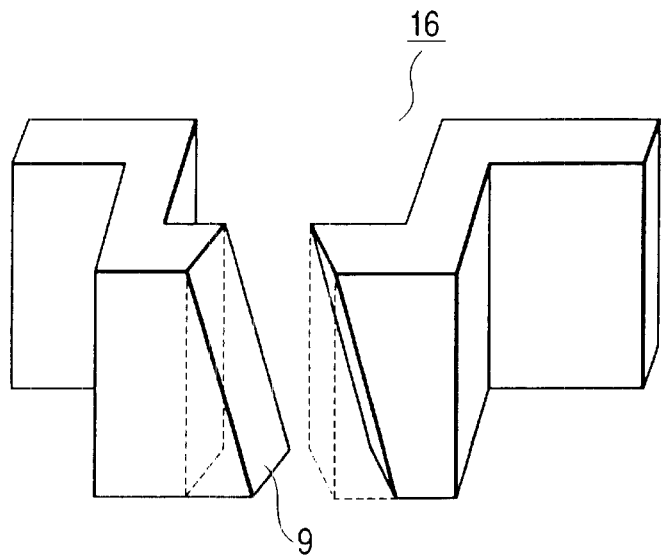
FIGS. 11A, 11B and 11C are perspective views each to show the main part of the slit in Embodiment 6 of the present invention.
Figure 11B:
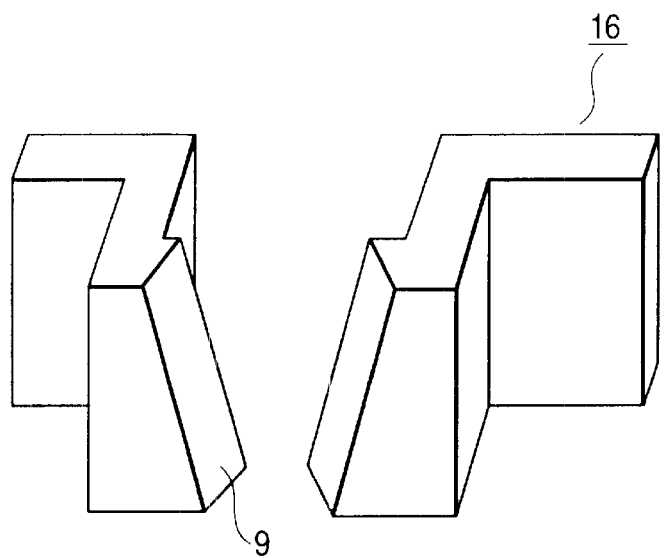
Figure 11C:
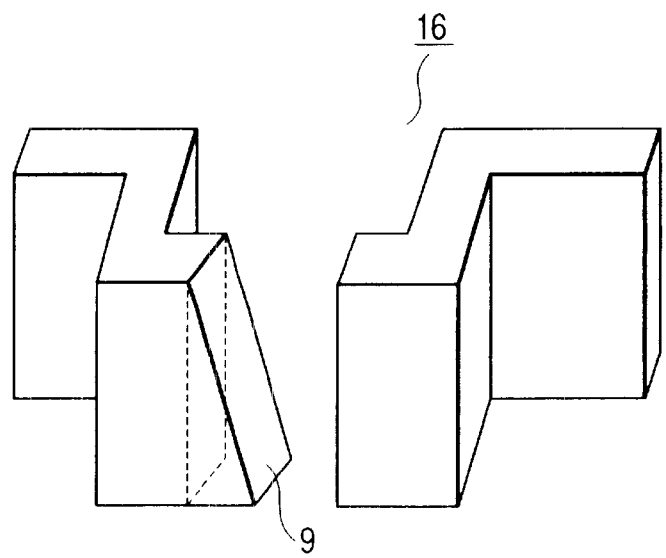
Figure 12:
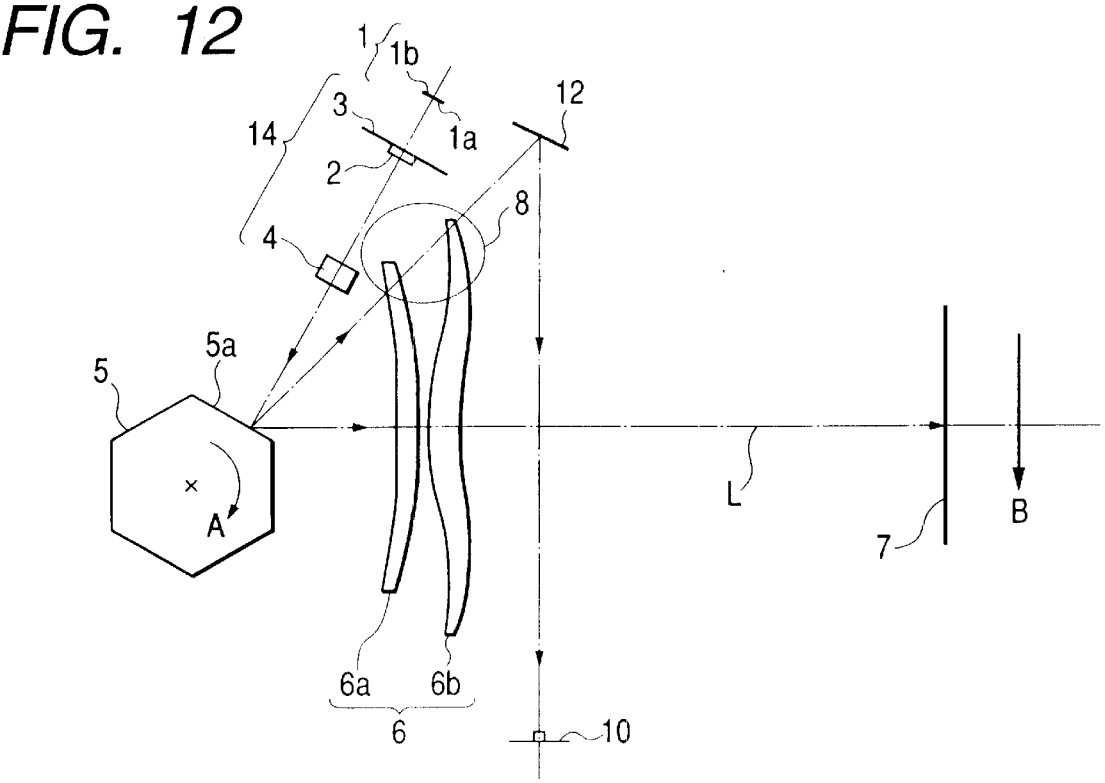
FIG. 12 is a cross-sectional view along the main scanning direction of Embodiment 7 of the present invention.
Figure 13:
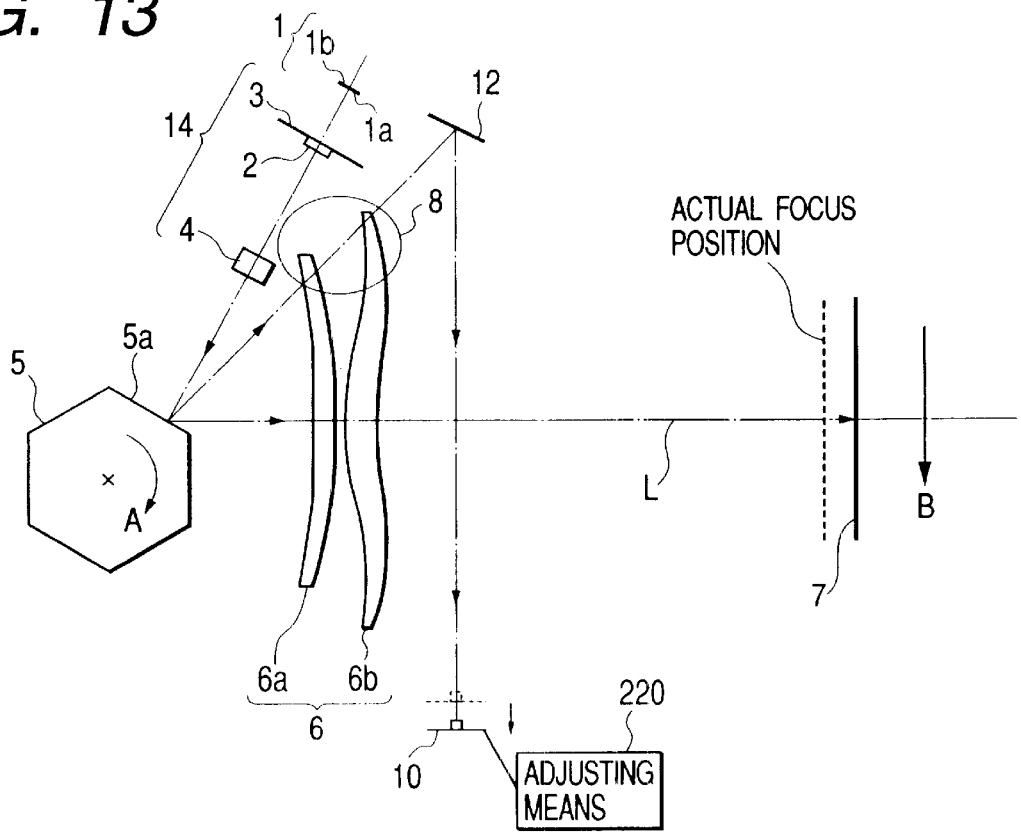
FIG. 13 is a cross-sectional view along the main scanning direction of Embodiment 8 of the present invention.
Figure 14:
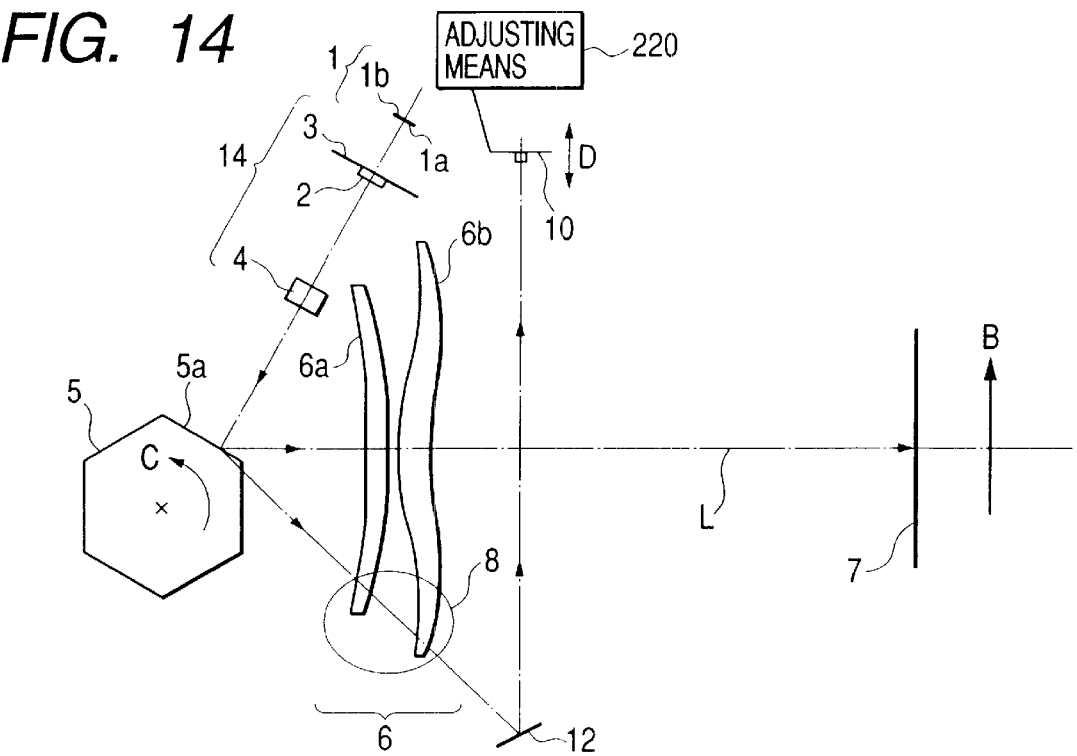
FIG. 14 is a cross-sectional view along the main scanning direction of Embodiment 9 of the present invention.
Figure 15:
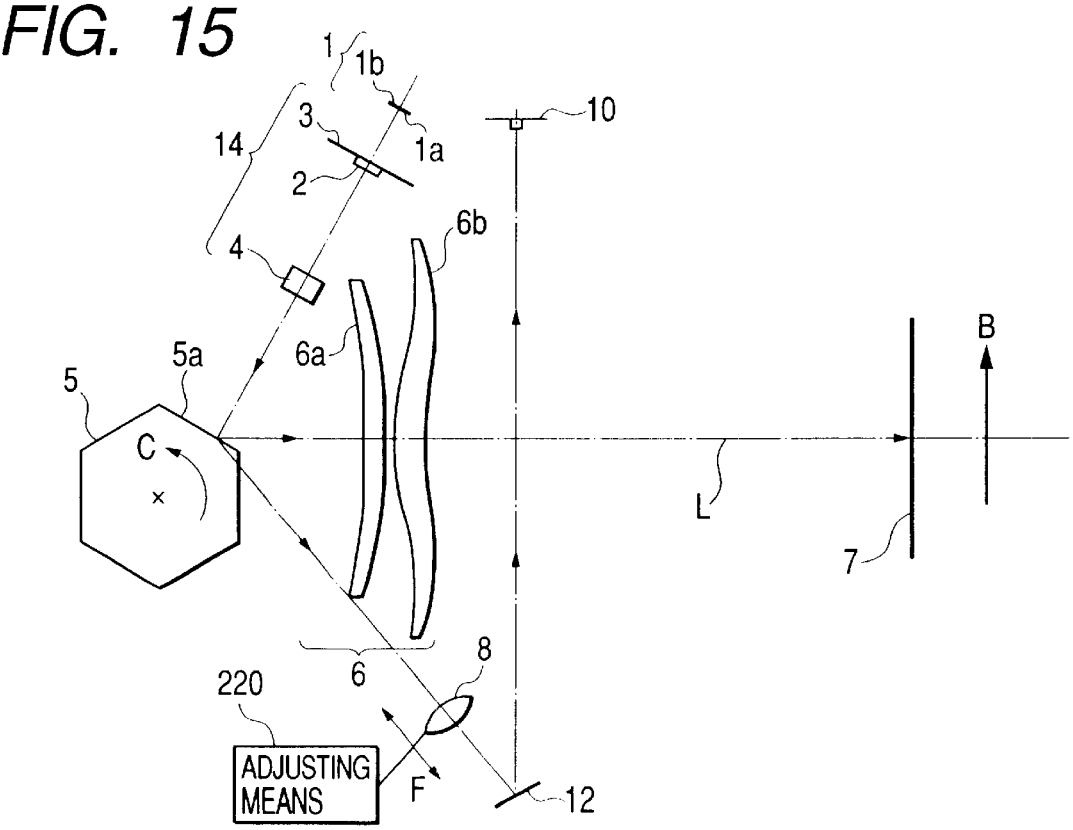
FIG. 15 is a cross-sectional view along the main scanning direction of Embodiment 10 of the present invention.
Figures 19A, 19B:
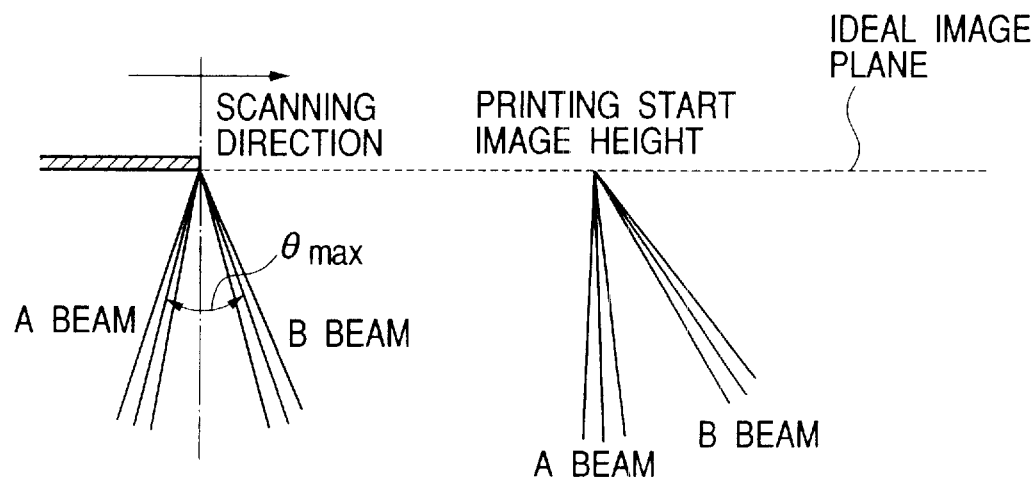
FIGS. 19A and 19B are explanatory diagrams to show the positional relation between beams before the focus is shifted to that side (away from the deflecting means)
Figures 20A, 20B:
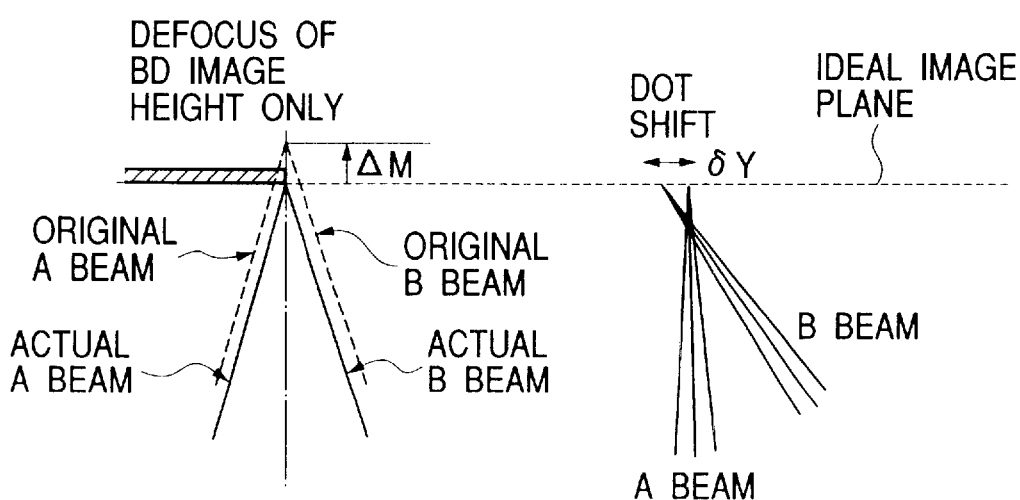
FIGS. 20A and 20B are explanatory diagrams to show the positional relation between beams after the focus is shifted to that side (away from the deflecting means)
Figure 22:
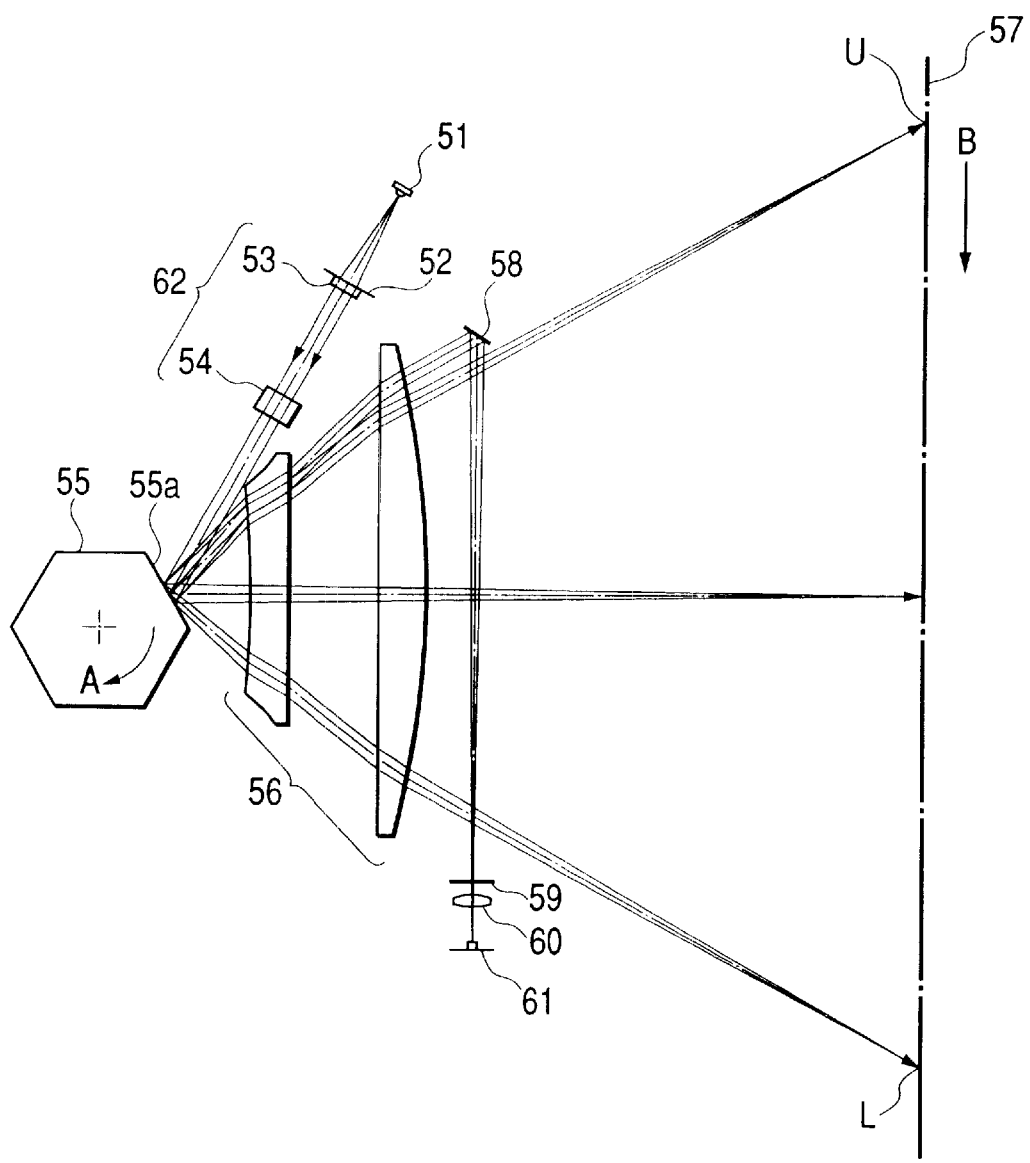
FIG. 22 is a cross-sectional view along the main scanning direction of the conventional multi-beam scanning optical system.

FIG. 10 is a principal, cross-sectional view in the main scanning direction (main scanning section view) of an application where the multi-beam scanning optical system of Embodiment 6 of the present invention is applied to the image forming apparatus such as the laser beam printer (LBP) or the like, and FIGS. 11A to 11C are perspective views of principal part of the BD slit plate 9 of FIG. 10. In FIG. 10 and FIGS. 11A to 11C the same elements as those illustrated in FIG. 6 are denoted by the same reference symbols.

The present embodiment is different from aforementioned Embodiment 5 in that the system is not provided with the angle adjusting means and in that the dot shift is corrected (or canceled) by inclining the BD slit plate 9 or a unit 16 including the BD slit plate 9 in the sub-scanning direction from the beginning. The other structure and optical action are approximately the same as in Embodiment 5, thereby accomplishing the same effect.

Namely, in the case where degrees of curvature of field of the scanning optical means 6 are considerably stable among products and where the difference |δX−δM| in Condition (A) is an unignorable value with placement of the BD slit plate 9 at the focus position, the dot shift is corrected (or canceled) by inclining the BD slit plate 9 in the sub-scanning direction from the beginning, as illustrated in FIG. 10 and FIGS. 11A to 11C. This permits the present embodiment to implement the high-quality printing at high speed.

[Embodiments 7, 8, 9, and 10]

FIG. 12, FIG. 13, FIG. 14, and FIG. 15 are the principal, cross-sectional views in the main scanning direction (main scanning section views) of applications where the multi-beam scanning optical systems of Embodiments 7, 8, 9 and 10, respectively, of the present invention are applied to the image forming apparatus such as the laser beam printer (LBP) or the like. In FIG. 12, FIG. 13, FIG. 14, and FIG. 15, the same elements as those illustrated in FIG. 1, FIG. 3, FIG. 4, and FIG. 5 are denoted by the same reference symbols.

Embodiment 7 corresponds to Embodiment 1, Embodiment 8 to Embodiment 2, Embodiment 9 to Embodiment 3, and Embodiment 10 to Embodiment 4. A different point common to these Embodiments 7, 8, 9, and 10 from aforementioned Embodiments 1, 2, 3, and 4 is that the system is constructed without use of the BD slit plate 9 and BD lens 11 in order to simplify the structure of the entire apparatus and decrease the cost. The other structure and optical action are approximately the same as in Embodiments 1, 2, 3, and 4, thereby achieving the same effect.

Specifically, in each of Embodiments 7, 8, 9, and 10 the effective edges of the BD sensor 10 have the function equivalent to the slit in the BD slit plate 9 in each of corresponding Embodiments 1, 2, 3, and 4 described previously. In each of Embodiments 7, 8, 9, and 10, therefore, the action effected in each of corresponding Embodiments 1, 2, 3, and 4 is carried out by replacing the surface of the BD slit plate 9 with the photoreceptive surface of the BD sensor 10. This allows each embodiment to accomplish the same effect as in the aforementioned corresponding embodiment.

In each of Embodiments 7, 8, 9, and 10, as described above, the system is constructed without use of the BD slit plate and BD lens, whereby each embodiment implements the high-quality printing in the relatively simple structure and at high speed while accomplishing the simplification and cost reduction of the entire apparatus.

[Embodiment 11]

FIG. 1 is a principal, cross-sectional view in the main scanning direction (main scanning section view) of an application where the multi-beam scanning optical system of Embodiment 11 of the present invention is applied to the image forming apparatus such as the laser beam printer (LBP) or the like.

If the focus position of each BD beam is shifted from the surface of the BD slit plate 9 for the reasons including the assembly errors, the focus errors of lenses, etc. as described previously, because the light-emitting regions 1a, 1b are also spaced from each other in the main scanning direction, particularly, in the present embodiment as illustrated in FIG. 2, the time when the principal ray of each BD beam goes past by an edge of the BD slit plate 9 will be different from that before occurrence of the defocus, and thus the write-start positions of images by the respective light-emitting regions 1a, 1b will deviate from each other.

In the present embodiment, therefore, each of the elements is arranged to satisfy Condition (B) given below.

$$|\delta M| \leq \delta Y\text{max}/\tan(\theta\text{max}) \qquad (B)$$

(where
  δM: distance along the direction of the optical axis of the BD optical system from the BD slit surface to the converging point in the main scanning section of the BD beams used for detection of synchronism;
  δYmax: permissible deviation amount (dot shift) between start positions of respective scan lines;
  θmax: maximum angle difference between angles of incidence of the respective BD beams used for detection of synchronism, onto the BD slit surface)

An example of specific numerals is as follows: with δYmax=11 μm and θmax=0.5°, |δM|=δMmax=1.26 mm. This permits the present embodiment to implement the high-quality printing at high speed.

In the present embodiment the permissible dot shift δYmax is set to not more than half of the resolution in the sub-scanning direction.

In the present embodiment each beam emitted from the light source unit 1 is converted into a nearly parallel beam by the collimator lens 2, but, without having to be limited to this, the same effect can also be achieved, for example, by converting each beam into a converging beam or into a diverging beam.

[Embodiment 12]

Figure 23:
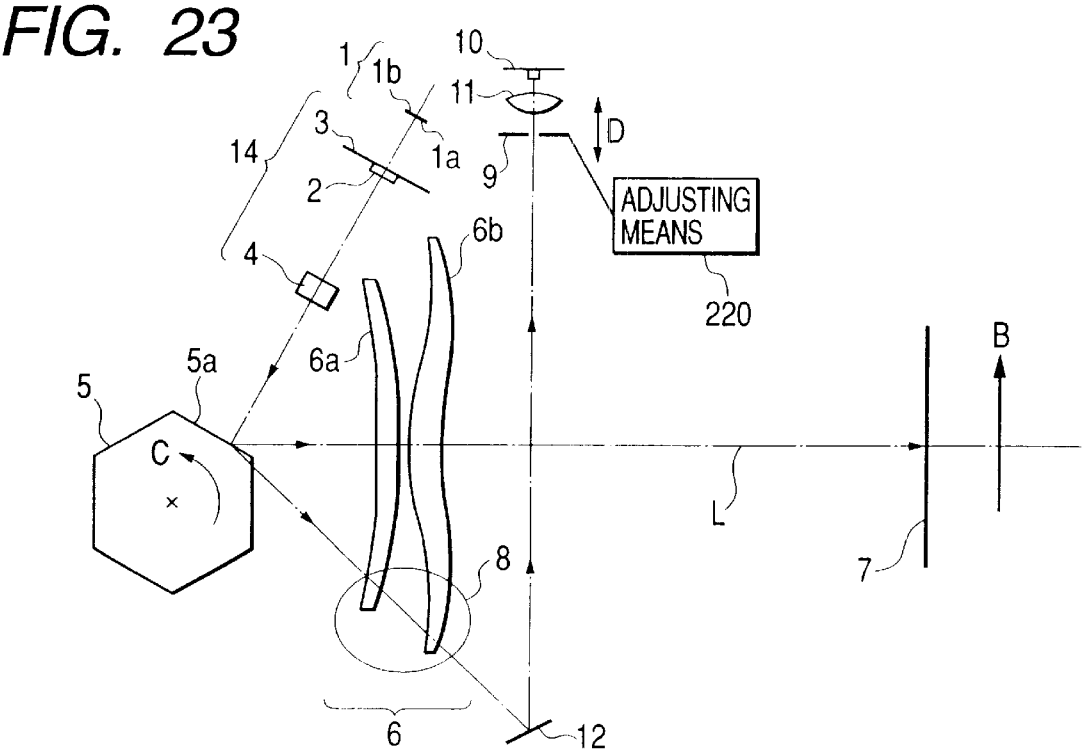
FIG. 23 is a cross-sectional view along the main scanning direction of Embodiment 12 of the present invention.

FIG. 23 is a principal, cross-sectional view in the main scanning direction (main scanning section view) of an application where the multi-beam scanning optical system of Embodiment 12 of the present invention is applied to the image forming apparatus such as the laser beam printer (LBP) or the like. In the same figure the same elements as those illustrated in FIG. 1 are denoted by the same reference symbols.

In the present embodiment the optical deflector 5 is rotated at a constant speed in the direction of the arrow C in the drawing, opposite to the rotating direction in aforementioned Embodiment 1, by the driving means such as a motor or the like (not illustrated). This is a solution to the space problem that the synchronism-detecting optical means (BD optical system) cannot be interposed between the scanning optical means 6 and the incidence optical means 14.

If the focus position of each BD beam is shifted from on the surface of the BD slit plate 9 as described in Embodiment 11, because the light-emitting regions 1a, 1b are also spaced from each other in the main scanning direction as illustrated in FIG. 2, particularly, in the present embodiment, the time when the principal ray of each BD beam goes past by the edge of the BD slit plate 9 will be different from that before occurrence of the defocus, and thus the start positions of images by the respective light-emitting regions 1a, 1b will deviate from each other. Since much higher image quality is demanded in the present embodiment, the above deviation between start positions is thus a problem.

Figure 29A:
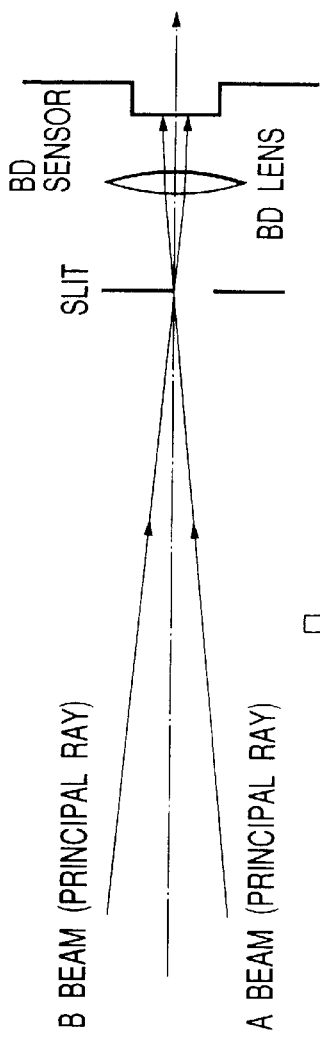
FIGS. 29A, 29B and 29C are explanatory diagrams to show the relations between defocus and each of the principal rays.
Figure 29B:
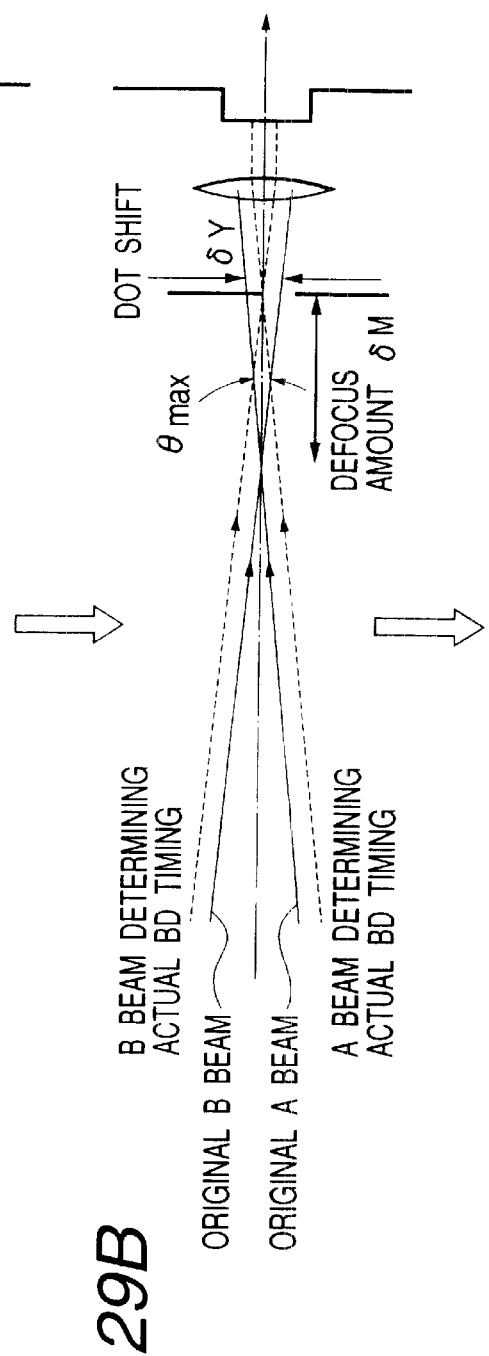
Figure 29C:
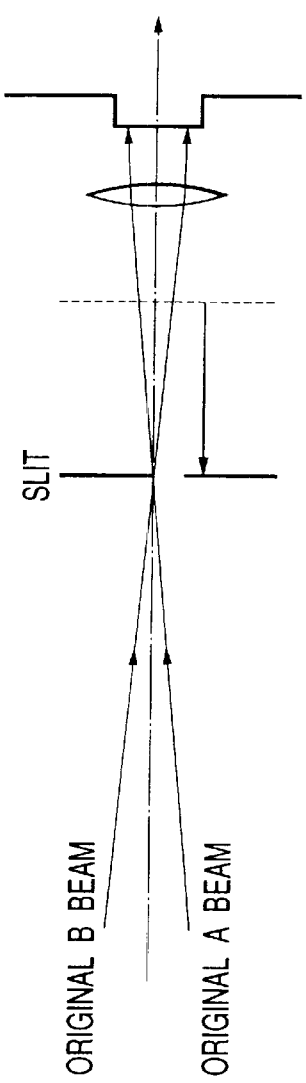

In the present embodiment, therefore, the converging state in the main scanning section of each BD beam on the surface of the BD slit plate 9 is adjusted by moving the BD slit plate 9 in the direction of the optical axis of the BD optical system, as indicated by the arrows D in FIG. 23, by the adjusting means (FIG. 30), whereby the converging state is improved from the state illustrated in FIG. 29B to the state illustrated in FIG. 29C, thereby implementing the high-quality printing at high speed.

Further, in the present embodiment each of the elements is set so as to satisfy aforementioned Condition (B), and an example of specific numerals is as follows; with $\delta Y_{max}=7$ $\mu m$ and $\theta_{max}=0.5°$, $|\delta M|=\delta M_{max}=0.80$ mm.

The optical action for formation of image using the multi-beam scanning optical system in the present embodiment is approximately the same as in aforementioned Embodiment 11.

Next described is the dot shift adjusting means employed in the present invention.

The BD slit plate 9 can be moved and adjusted in the direction of the optical axis of the cylinder lens 11 by the adjusting means 220 constituting the multi-beam scanning optical system of the present invention. Namely, the BD slit plate 9 is fixed to the support member 221 with an adhesive or the like, as illustrated in FIG. 30. The support member 221 is fitted on the guide 222 so as to be movable in the direction of the optical axis. The holder 223 is fixed in the image forming apparatus.

The guide 222 is fixed to the holder 223 of the "U-shape" fixed to the stationary member of the apparatus. The compressive spring 224 is interposed between the holder 223 and the support member 221 to exert the resilient force acting to the right in the drawing, on the support member 221. The adjusting screw 225 in mesh with the holder 223 has the tip portion kept in contact with the adjusting means 220 from the right to stop movement of the support member due to the above resilient force of the spring 224. Therefore, the support member 221 can be displaced to the left in the drawing by feeding the adjusting screw 225 or to the right by loosening the adjusting screw 225, and the position of the BD slit plate 9 is moved and adjusted in the direction of the optical axis so as to satisfy Condition (B), based on the measured deviation $\delta Y$ between the start positions of the A- and B-beams on the surface to be scanned.

[Embodiment 13]

Figure 24:
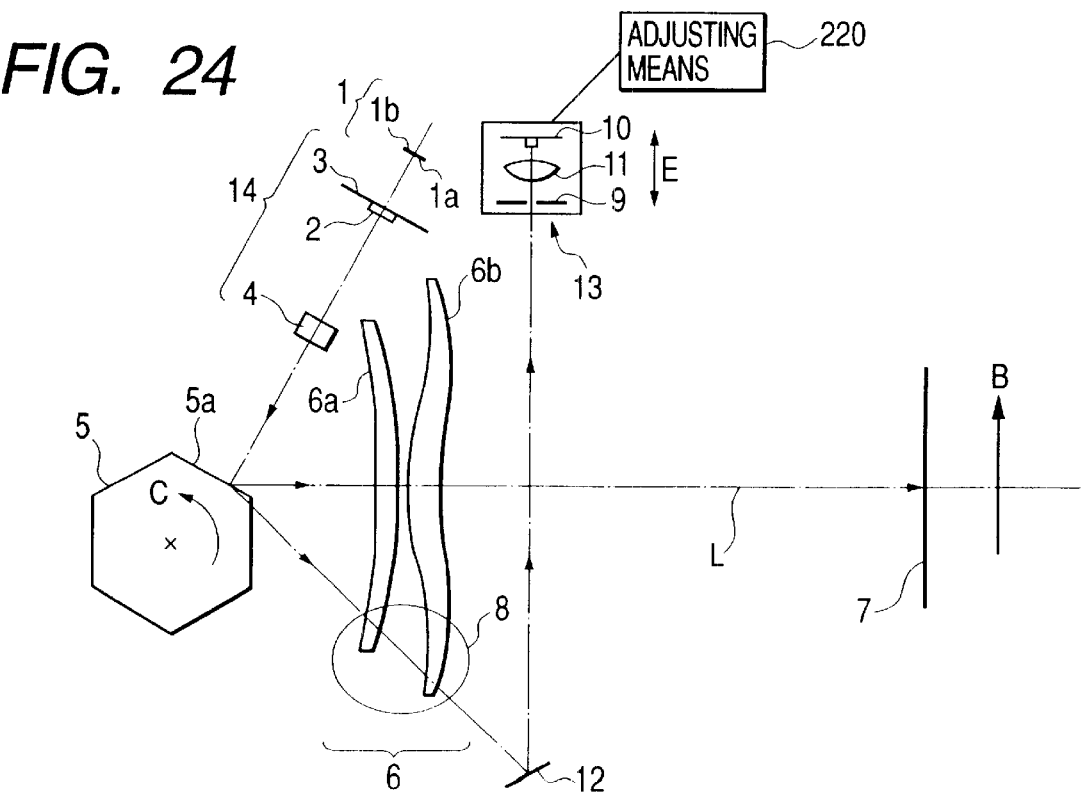
FIG. 24 is a cross-sectional view along the main scanning direction of Embodiment 13 of the present invention.

FIG. 24 is a principal, cross-sectional view in the main scanning direction (main scanning section view) of an application where the multi-beam scanning optical system of Embodiment 13 of the present invention is applied to the image forming apparatus such as the laser beam printer (LBP) or the like. In the same figure the same elements as those illustrated in FIG. 1 are denoted by the same reference symbols.

The present embodiment is different from aforementioned Embodiment 12 in that a single holding member 13 holds the BD slit plate 9, the optical element (BD lens) 11 placed between the BD slit plate 9 and the BD sensor 10, and the BD sensor 10 and in that the holding member 13 is moved in the direction of the optical axis of the BD optical system by the adjusting means, so as to permit adjustment of the converging state in the main scanning section of each BD beam on the surface of the BD slit plate 9. The other structure and optical action are approximately the same as in Embodiment 12, thereby accomplishing the same effect.

Specifically, in the present embodiment, as also described in aforementioned Embodiment 11, the BD lens 11 is placed behind the BD slit plate 9 and establishes the conjugate relation between the vicinity of the reflecting surface of the BD mirror 12 and the vicinity of the BD sensor 10, thereby having the inclination correction function. It is, however, particularly important to accurately determine the distance between the BD lens 11 and the BD sensor 10 in order to realize the above inclination correction function. This is because the distance K from the BD mirror 12 to the BD sensor 10 is defined by K=S+T, where S is the distance between the BD mirror 12 and the BD lens 11 and T is the distance between the BD lens 11 and the BD sensor 10.

In comparison with it, supposing the holding member 13 is moved by $\delta S$ with the BD lens 11 toward the BD sensor 10 in order to adjust the converging state of the BD beams on the surface of the BD slit plate 9, the distance K' from the BD mirror 12 to the BD sensor 10 will be given by the following equation.

$$K'=S+T+(1-f^2/(S-f)^2)*\delta S$$

In this equation, f is the focal length of the BD lens 11.

In general, the focal length f of the BD lens 11 is very small relative to the distance S between the BD mirror 12 and the BD lens 11, and thus the distance K' can be approximated as the following equation.

$$K'\approx S+T+\delta S$$

There is little change in the distance T between the BD lens 11 and the BD sensor 10. It is thus necessary to always maintain the original distance in order to realize the inclination correction function. If the position of the BD slit plate 9 itself deviates to cause the difference between the start positions of scan lines, it will undesirably cause the phenomenon as described above. In addition, since the distance from the BD slit plate 9 and the BD sensor 10 is actually very small, the assembly of the BD slit plate 9, the BD lens 11, and the BD sensor 10 in the single holding member 13 is more advantageous in gaining higher accuracy of positional relation.

In the present embodiment, therefore, the same holding member 13 holds the BD slit plate 9, the BD lens 11, and the BD sensor 10 as described above and the holding member 13 is moved in the direction of the optical axis of the BD optical system, as indicated by arrows E in FIG. 24, by the adjusting means (not illustrated), thereby adjusting the converging state in the main scanning section of each BD beam on the surface of the BD slit plate 9. This permits the present embodiment to implement the high-quality printing at high speed.

[Embodiment 14]

Figure 25:
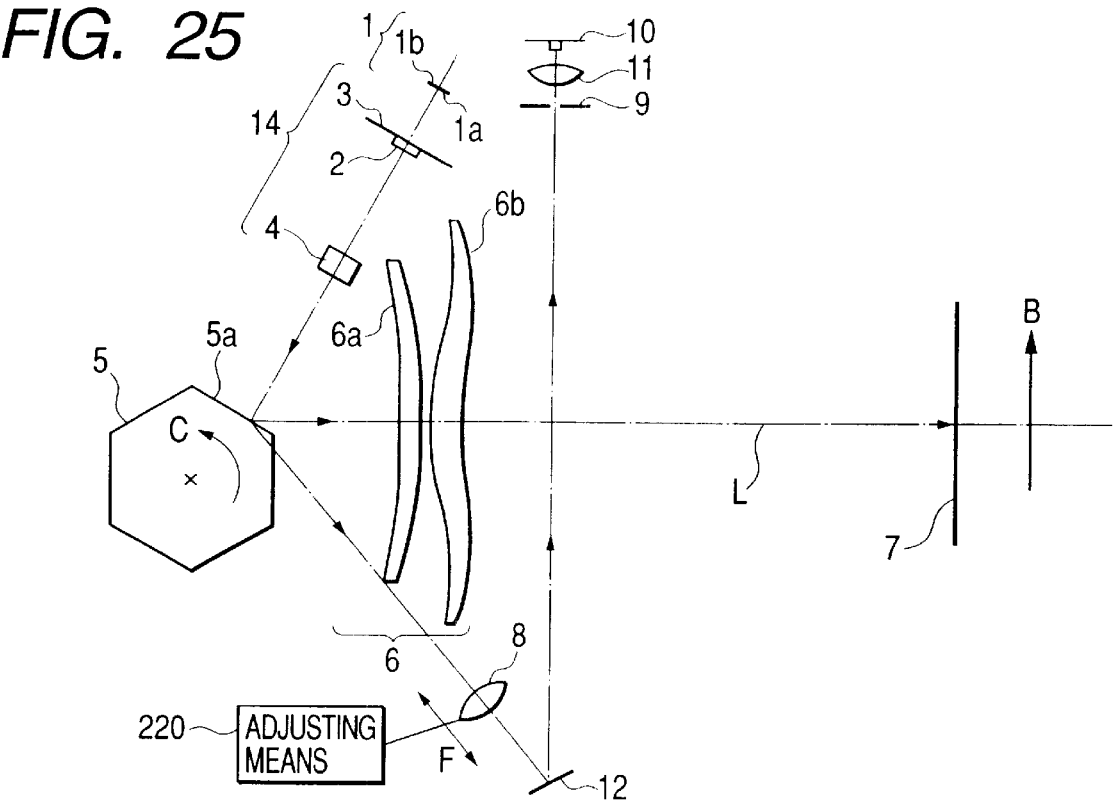
FIG. 25 is a cross-sectional view along the main scanning direction of Embodiment 14 of the present invention.

FIG. 25 is a principal, cross-sectional view in the main scanning direction (main scanning section view) of an application where the multi-beam scanning optical system of Embodiment 14 of the present invention is applied to the image forming apparatus such as the laser beam printer (LBP) or the like. In the same figure the same elements as those illustrated in FIG. 23 are denoted by the same reference symbols.

The present embodiment is different from aforementioned Embodiment 12 in that the lens section 8 is provided independently without being integrated with the scanning optical means 6, the BD slit plate 9 is fixed, and the lens section 8 is moved in the direction of the optical axis of the BD optical system by the adjusting means, so as to permit adjustment of the converging state in the main scanning section of each BD beam on the surface of the BD slit plate 9. The other structure and optical action are almost the same as in Embodiment 12, thereby accomplishing the same effect.

Specifically, in the present embodiment the lens section 8 consisting of a single lens is placed separately without being integrated with the scanning optical means 6 and the lens section 8 is moved in the direction of the optical axis of the BD optical system, as indicated by arrows F in FIG. 25, by the adjusting means (FIG. 30), thereby adjusting the converging state in the main scanning section of each BD beam on the surface of the BD slit plate 9. This attains improvement from the state illustrated in FIG. 29B to the state illustrated in FIG. 29A.

[Embodiment 15]

Figure 26:
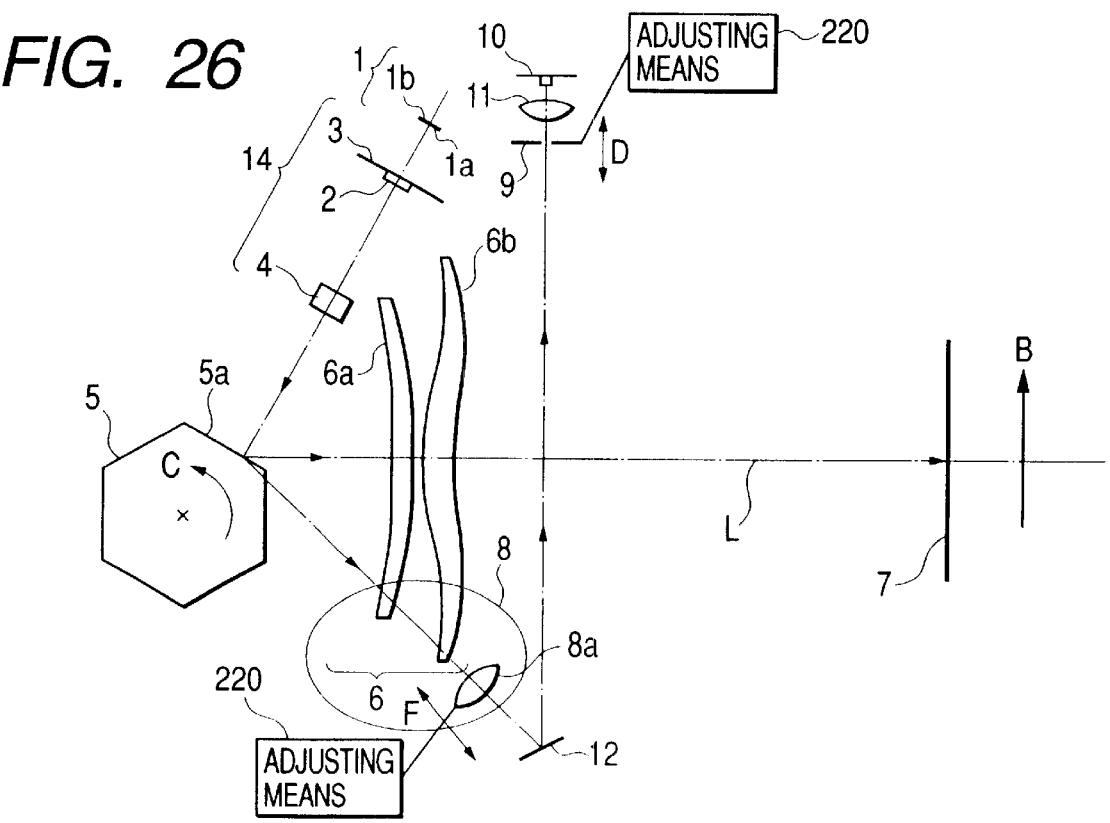
FIG. 26 is a cross-sectional view along the main scanning direction of Embodiment 15 of the present invention.

FIG. 26 is a principal, cross-sectional view in the main scanning direction (main scanning section view) of an application where the multi-beam scanning optical system of Embodiment 15 of the present invention is applied to the image forming apparatus such as the laser beam printer (LBP) or the like. In the same figure the same elements as those illustrated in FIG. 23 are denoted by the same reference symbols.

The present embodiment is different from aforementioned Embodiment 12 in that at least part of the lenses constituting the lens section 8 are integrated with the scanning optical means 6 and in that at least part of the lens section 8 not integrated with the scanning optical means 6, i.e., the lens 8a, and the BD slit plate 9 are moved in the direction of the optical axis of the BD optical system by the adjusting means, so as to permit adjustment of the converging state in the main scanning section of each BD beam on the surface of the BD slit plate 9. The other structure and optical action are almost the same as in Embodiment 12, thereby accomplishing the same effect.

Namely, in the present embodiment at least part of the lenses constituting the lens section 8 are integrated with the scanning optical means 6 and part of the lens section 8 not integrated with the scanning optical means 6, i.e., the lens 8a, and the BD slit plate 9 are moved in the direction of the optical axis of the BD optical system by the adjusting means (FIG. 30), thereby adjusting the converging state in the main scanning section of each BD beam on the surface of the BD slit plate 9. This achieves the improvement from the state illustrated in FIG. 29B to the state illustrated in FIG. 29C.

The present embodiment accomplished the improvement by moving both the lens 8a of the lens section 8 and the BD slit plate 9, but the present invention can also be applied with movement of only either one of them, as in aforementioned Embodiment 5.

[Embodiment 16]

Figure 27:
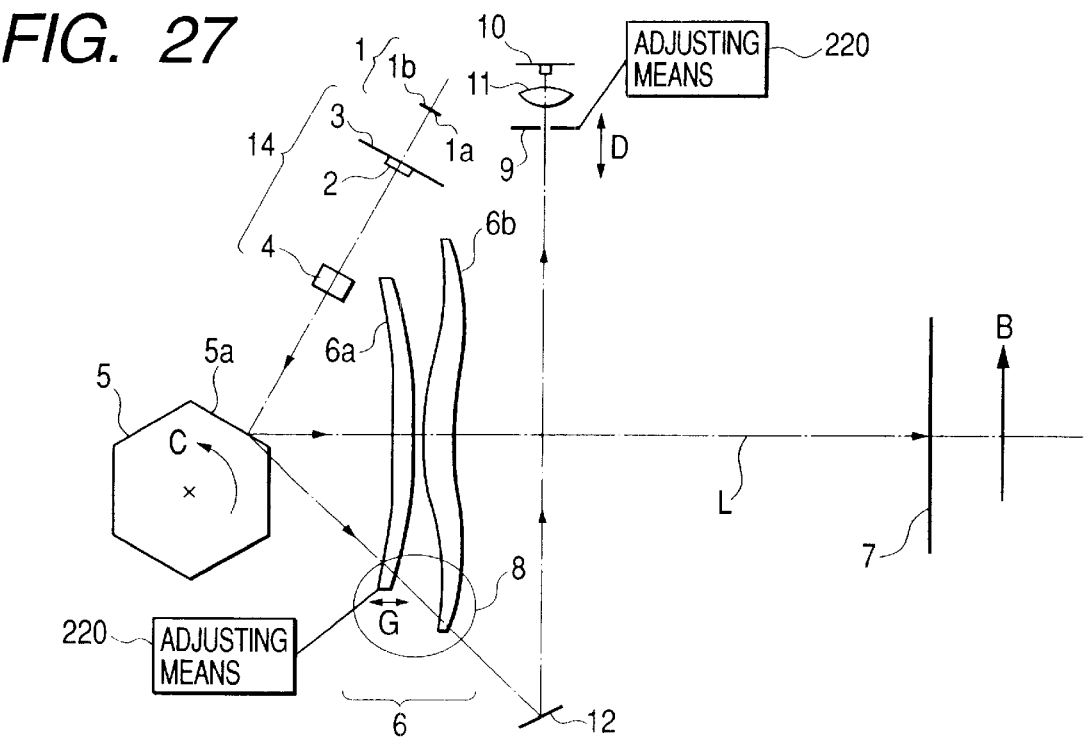
FIG. 27 is a cross-sectional view along the main scanning direction of Embodiment 16 of the present invention.

FIG. 27 is a principal, cross-sectional view in the main scanning direction (main scanning section view) of an application where the multi-beam scanning optical system of Embodiment 16 of the present invention is applied to the image forming apparatus such as the laser beam printer (LBP) or the like. In the same figure the same elements as those illustrated in FIG. 23 are denoted by the same reference symbols.

The present embodiment is different from aforementioned Embodiment 12 in that at least part of the scanning optical means 6 integrated with the lens section 8, i.e., the optical element (f-θ lens), is moved in the direction of the optical axis of the scanning optical means 6 and the BD slit plate 9 is moved in the direction of the optical axis of the BD optical system, thereby permitting adjustment of the converging state in the main scanning section of each BD beam on the surface of the BD slit plate 9. The other structure and optical action are approximately the same as in Embodiment 12, thereby accomplishing the same effect.

Specifically, the present embodiment is configured so that, within a range in which the shape of the spots does not change much on the surface to be scanned 7, the first optical element (f-θ lens) 6a forming the scanning optical means 6 is moved in the direction of arrows G in the drawing (i.e., in the direction of the optical axis of the scanning optical means 6) by the adjusting means (FIG. 30) and the BD slit plate 9 is moved in the direction of arrows D in the drawing (i.e., in the direction of the optical axis of the BD optical system), thereby adjusting the converging state in the main scanning section of each BD beam on the surface of the BD slit plate 9. This permits the present embodiment to achieve the improvement from the state illustrated in FIG. 29B to the state illustrated in FIG. 29C.

The first optical element 6a is moved in the present embodiment, but it can also be contemplated that the second optical element (f-θ lens) 6b is moved or that both the first and second optical elements 6a, 6b are moved.

The present embodiment was configured to move both the first optical element 6a and the BD slit plate 9, but the present invention can also be applied with movement of only either one of them, as in aforementioned Embodiment 6.

[Embodiment 17]

Figure 28:
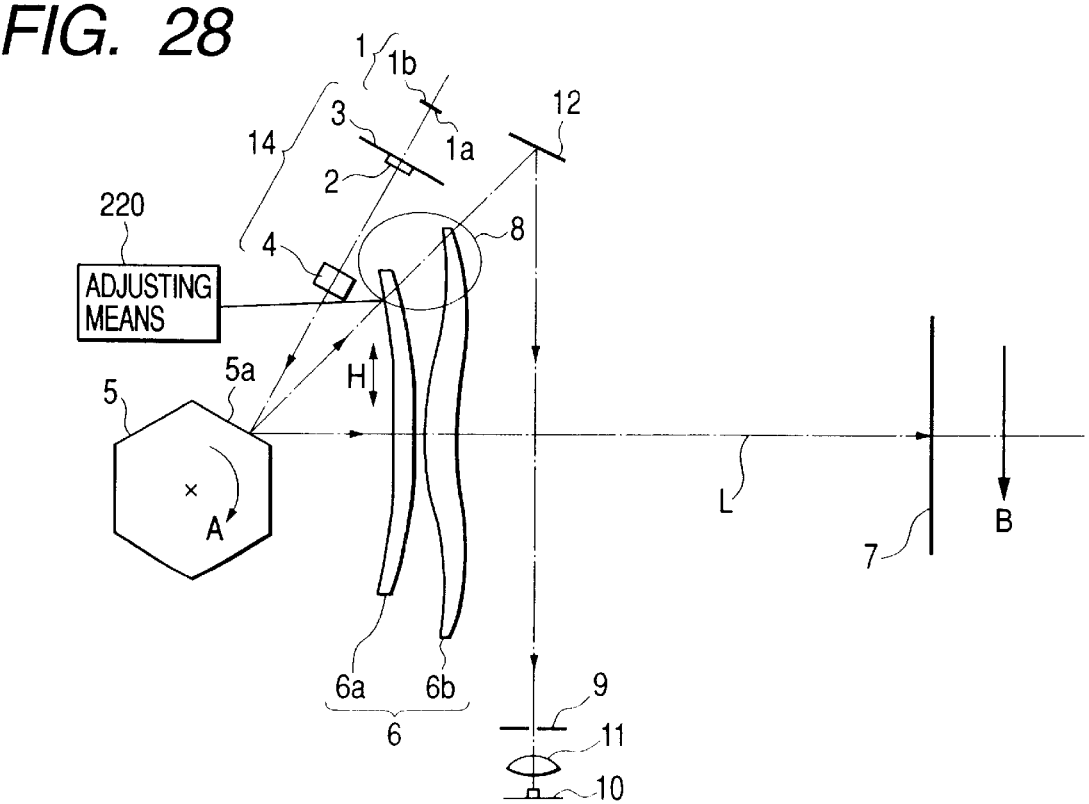
FIG. 28 is a cross-sectional view along the main scanning direction of Embodiment 17 of the present invention.

FIG. 28 is a principal, cross-sectional view in the main scanning direction (main scanning section view) of an application where the multi-beam scanning optical system of Embodiment 17 of the present invention is applied to the image forming apparatus such as the laser beam printer (LBP) or the like. In the same figure the same elements as those illustrated in FIG. 1 are denoted by the same reference symbols.

The present embodiment is different from aforementioned Embodiment 12 in that the BD slit plate 9 is fixed, at least one optical element (f-θ lens) forming the scanning optical means 6 integrated with the lens section 8 is moved in the main scanning direction, thereby permitting adjustment of the converging state in the main scanning section of each BD beam on the surface of the BD slit plate 9, and the rotating direction of the optical deflector is opposite (or is the direction of the arrow A in the drawing). The other structure and optical action are approximately the same as in Embodiment 12, thereby accomplishing the same effect.

Specifically, in the present embodiment the BD slit plate 9 is fixed and the first optical element 6a with sudden change in local curvature in the main scanning direction, particularly, in the peripheral area, out of a plurality of lenses constituting the scanning optical means 6 integrated with the lens section 8, is moved in the main scanning direction, as indicated by arrows H in the drawing, in the range in which the shape of the spots does not vary much on the surface to be scanned 7, by the adjusting means (FIG. 30), thereby changing the longitudinal magnification in the main scanning direction of each BD beam so as to adjust the converging state in the main scanning section of each BD beam on the surface of the BD slit plate 9. This permits the present embodiment to achieve the improvement from the state illustrated in FIG. 29B to the state illustrated in FIG. 29A.

The first optical element 6a is moved in the main scanning direction in the present embodiment, but it can also be contemplated that the second optical element (f-θ lens) 6b is moved or that both the first and second optical elements 6a, 6b are moved.

[Embodiment 18]

In this Embodiment 18 the dot shift on the surface to be scanned, which occurs because of the defocus δX in the main scanning section of the BD beams guided to the BD sensor 10 and in the view from the BD slit plate 9, is corrected by rotationally adjusting the BD slit plate 9 or the unit 16 including the BD slit plate 9 about the optical axis of the BD optical system by the angle adjusting means 15 as a correction means illustrated in FIG. 7.

Namely, the light source unit 1 in the present embodiment has the light-emitting regions 1a, 1b also spaced apart from each other in the sub-scanning direction, as illustrated in aforementioned FIG. 2, and the A- and B-beams corresponding to the respective light-emitting regions 1a, 1b pass different positions in the sub-scanning direction.

In the present embodiment, therefore, the BD slit plate 9 is rotated, as illustrated in FIGS. 8A, 8B and FIGS. 9A, 9B, by the angle adjusting means 15, thereby changing the time when the B-beam starts entering the BD sensor 10, with respect to the A-beam. FIGS. 8A and 8B are the explanatory diagrams to show the inclination of the BD slit plate 9 and the printing positions (before adjustment) of the respective beams and FIGS. 9A and 9B the explanatory diagrams to show the inclination of the BD slit plate 9 and the printing positions (after adjustment) of the respective beams.

In the present embodiment, as described above, the dot shift on the surface to be scanned, which inevitably occurred before because of the defocus δX in the main scanning section of each BD beam guided to the BD sensor 10 as described above, is corrected (or canceled) by rotationally adjusting the BD slit plate 9 by use of the angle adjusting means 15. This permits the present embodiment to implement the high-quality printing at high speed.

The optical action for formation of image using the multi-beam scanning optical system in the present embodiment is approximately the same as in aforementioned Embodiment 11.

[Embodiment 19]

FIG. 10 is a principal, cross-sectional view in the main scanning direction (main scanning section view) of an application where the multi-beam scanning optical system of Embodiment 19 of the present invention is applied to the image forming apparatus such as the laser beam printer (LBP) or the like, and FIGS. 11A to 11C are the perspective views of the main part of the BD slit plate 9 in FIG. 10. In FIG. 10 and FIGS. 11A to 11C the same elements as those illustrated in FIG. 6 are denoted by the same reference symbols.

The present embodiment is different from aforementioned Embodiment 18 in that the system is not provided with the angle adjusting means and in that the dot shift on the surface to be scanned is corrected (or canceled) by inclining the BD slit plate 9 or the unit 16 including the BD slit plate 9 in the sub-scanning direction from the beginning. The other structure and optical action are approximately the same as in Embodiment 18, thereby accomplishing the same effect.

Namely, in the case where degrees of curvature of field of the scanning optical means 6 are considerably stable among products and where the difference |δX| in Condition (B) is an unignorable value with placement of the BD slit plate 9 at the focus position, the dot shift on the surface to be scanned is corrected (or canceled) by inclining the BD slit plate 9 in the sub-scanning direction from the beginning, as illustrated in FIG. 10 and FIGS. 11A to 11C. This permits the present embodiment to implement the high-quality printing at high speed.

[Embodiments 20, 21, 22, 23, 24, 25, and 26]

Embodiments 20, 21, 22, 23, 24, 25, and 26 correspond to Embodiments 11, 12, 13, 14, 15, 16, and 17, respectively, and a different point common to these Embodiments 20, 21, 22, 23, 24, 25, and 26 from aforementioned Embodiments 11, 12, 13, 14, 15, 16, and 17 is that the system is constructed without use of the BD slit plate 9 and the BD lens 11 in order to simplify the structure of the entire apparatus and decrease the cost. The other structure and optical action are almost the same as in each of corresponding Embodiments 11, 12, 13, 14, 15, 16, and 17, thereby accomplishing the same effect.

Namely, in each of Embodiments 20, 21, 22, 23, 24, 25, and 26 the effective edges of the BD sensor 10 have the function equivalent to the slit in the BD slit plate 9 in each of corresponding Embodiments 11, 12, 13, 14, 15, 16, and 17 described previously. In each of Embodiments 20, 21, 22, 23, 24, 25, and 26, therefore, the action effected in each of corresponding Embodiments 11, 12, 13, 14, 15, 16, and 17 is carried out by replacing the surface of the BD slit plate 9 with the photoreceptive surface of the BD sensor 10. This permits each embodiment to accomplish the same effect as in the corresponding embodiment described above.

In each of Embodiments 20, 21, 22, 23, 24, 25, and 26, as described above, the system is constructed without use of the BD slit plate and the BD lens, whereby each embodiment implements the high-quality printing in the relatively simple structure and at high speed while realizing the simplification and cost reduction of the entire apparatus.

In the present invention, as described above, where δM is the defocus amount in the main scanning section of the beams guided to the synchronism detector and in the view from the BD slit plate (or the photoreceptive surface of the synchronism detector if the BD slit plate is not used) and where δX is the defocus amount at each image height on the surface to be scanned, the elements are set so that the defocus amount δX satisfies Condition (A), whereby the invention can attain the multi-beam scanning optical system capable of implementing the high-quality printing in the relatively simple structure and at high speed and the image forming apparatus using it.

Further, according to the present invention, the dot shift, which occurs because of the difference between the two defocus amounts δM, δX, i.e., the defocus amount δM in the main scanning section of the beams guided to the synchronism detector and in the view from the BD slit plate and the defocus amount δX at each image height on the surface to be scanned 7 as described previously, is corrected by the correction means, whereby the present invention can attain the multi-beam scanning optical system capable of implementing the high-quality printing in the relatively simple structure and at high speed and the image forming apparatus using it.

The present invention provides the multi-beam scanning optical system having the incidence optical means for guiding a plurality of beams emitted from the light source means provided with a plurality of light-emitting regions, to the deflecting means, the scanning optical means for focusing a plurality of beams deflected by the deflecting means on the surface to be scanned, to form a plurality of scan lines, and the synchronism-detecting optical means for converging part of the plurality of beams deflected by the deflecting means, via the return mirror on the slit surface by the lens section, thereafter guiding the beams to the synchronism detector, and controlling the timing of the scan start position on the surface to be scanned for each of the plurality of beams by use of the signal from the synchronism detector, as described above, wherein the elements are set so as to satisfy Condition (B) or wherein the converging state of the plurality of beams in the main scanning section is made adjustable on the slit surface by the adjusting means; thus, the present invention can attain the multi-beam scanning optical system capable of implementing the high-quality printing in the relatively simple structure and at high speed and the image forming apparatus using it.

What is claimed is:

1. A multi-beam scanning optical system comprising:
   incidence optical means for guiding a plurality of beams emitted from light source means having a plurality of light-emitting regions spaced apart from each other in a main scanning direction, to deflecting means;
   scanning optical means for focusing the plurality of beams deflected by the deflecting means, on a surface to be scanned, to form a plurality of scan lines;
   synchronism-detecting optical means for converging at least one of the plurality of beams deflected by the deflecting means on a slit surface and thereafter guiding the at least one of the plurality of beams to a synchronism detector, and controlling timing of a scan start position on the surface to be scanned for the plurality of beams by use of a signal from the synchronism detector; and
   correction means for correcting a dot shift per scan line on the surface to be scanned, which occurs because of a defocus amount δM1 in a main scanning section of the at least one of the plurality of beams guided to the synchronism detector and in a view from the slit surface.

2. The multi-beam scanning optical system according to claim 1, wherein said dot shift is not more than half of resolution in a sub-scanning direction.

3. The multi-beam scanning optical system according to claim 1, wherein said plurality of light-emitting regions are spaced apart from each other in the main scanning direction and in the sub-scanning direction.

4. The multi-beam scanning optical system according to claim 3, wherein a slit in said slit surface is inclined in the sub-scanning direction according to the dot shift per scan line on said surface to be scanned.

5. The multi-beam scanning optical system according to claim 3, comprising rotating means for rotating said slit surface or a unit including the slit surface about the optical axis of the synchronism-detecting optical means according to the dot shift per scan line on said surface to be scanned.

6. An image forming apparatus comprising:
   the multi-beam scanning optical system as set forth in any one of claims 1 to 5;
   a photosensitive member placed on said surface to be scanned;
   a developing unit for developing an electrostatic latent image formed on said photosensitive member with scanning light by said multi-beam scanning optical system, into a toner image;
   a transfer unit for transferring said developed toner image onto a transfer medium; and
   a fixing unit for fixing the transferred toner image on the transfer medium.

7. An image forming apparatus comprising:
   the multi-beam scanning optical system as set forth in any one of claims 1 to 5; and
   a printer controller for converting code data supplied from an external device, into an image signal and entering the image signal into said multi-beam scanning optical system.

8. A multi-beam scanning optical system comprising:
   incidence optical means for guiding a plurality of beams emitted from light source means having a plurality of light-emitting regions spaced apart from each other in a main scanning direction, to deflecting means;
   scanning optical means for focusing the plurality of beams deflected by the deflecting means, on a surface to be scanned, to form a plurality of scan lines; and
   synchronism-detecting optical means for converging at least one of the plurality of beams deflected by the deflecting means on a slit surface and thereafter guiding the at least one of the plurality of beams to a synchronism detector, and controlling timing of a scan start position on the surface to be scanned for the plurality of beams by use of a signal from the synchronism detector,
   wherein a dot shift per scan line on the surface to be scanned, which occurs because of a defocus amount δM1 in a main scanning section of the at least one of the plurality of beams guided to the synchronism detector and in a view from the slit surface, is not more than half of resolution in a sub-scanning direction.

* * * * *